United States Patent
Tanaka et al.

(10) Patent No.: US 10,452,583 B2
(45) Date of Patent: Oct. 22, 2019

(54) DATA TRANSFER DEVICE AND DATA TRANSFER METHOD HAVING A SHORTER TIME INTERVAL BETWEEN PIECES OF FINAL TRANSFER DATA IN A FRAME IMAGE

(71) Applicant: OLYMPUS CORPORATION, Hachioji-shi, Tokyo (JP)

(72) Inventors: Yoshinobu Tanaka, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/814,879

(22) Filed: Nov. 16, 2017

(65) Prior Publication Data

US 2018/0081842 A1 Mar. 22, 2018

Related U.S. Application Data

(63) Continuation of application No. PCT/JP2016/066585, filed on Jun. 3, 2016.

(30) Foreign Application Priority Data

Jun. 15, 2015 (JP) .................................. 2015-120074

(51) Int. Cl.
*G06F 13/36* (2006.01)
*G06F 13/362* (2006.01)
(Continued)

(52) U.S. Cl.
CPC ...... *G06F 13/3625* (2013.01); *G06F 13/1673* (2013.01); *G06F 13/38* (2013.01);
(Continued)

(58) Field of Classification Search
CPC ... H04N 1/00; G06F 13/3625; G06F 13/4282; G06F 13/4022; G06F 13/1673; G06F 13/42; G06F 13/38
See application file for complete search history.

(56) References Cited

U.S. PATENT DOCUMENTS

| 4,829,421 A | * | 5/1989 | Ritchie | ................. G06F 3/1293 |
| | | | | 709/234 |
| 2006/0020728 A1 | * | 1/2006 | Nakazono | ........... G06F 13/3625 |
| | | | | 710/113 |

(Continued)

FOREIGN PATENT DOCUMENTS

| JP | 2006-39672 A | 2/2006 |
| JP | 2010-199880 A | 9/2010 |

(Continued)

OTHER PUBLICATIONS

International Search Report dated Aug. 2, 2016, issued in counterpart International Application No. PCT/JP2016/066585 (2 pages, including Japanese original and English translation).

(Continued)

*Primary Examiner* — Jing-Yih Shyu
(74) *Attorney, Agent, or Firm* — Westerman, Hattori, Daniels & Adrian, LLP

(57) ABSTRACT

A data transfer device including a buffer unit configured to temporarily store transfer data that is transferred to a common bus, a write control unit configured to write input data as the transfer data to the buffer unit, a read control unit configured to read the transfer data from the buffer unit, an interface unit configured to transfer the transfer data to the common bus according to a predetermined bus protocol, the transfer data being read from the buffer unit by the read control unit, and a band-smoothing unit configured to smooth a band of the common bus by switching between the time intervals between pieces of the transfer data based on (Continued)

a position of the transfer data in a frame image, during a period when the transfer data is transferred to the common bus based on a position of the transfer data in a frame image.

4 Claims, 21 Drawing Sheets

(51) Int. Cl.
    *G06F 13/38*     (2006.01)
    *G06F 13/42*     (2006.01)
    *G06F 13/16*     (2006.01)
    *G06F 13/40*     (2006.01)
    *H04N 1/00*     (2006.01)

(52) U.S. Cl.
    CPC .......... *G06F 13/4022* (2013.01); *G06F 13/42* (2013.01); *G06F 13/4282* (2013.01); *H04N 1/00* (2013.01)

(56) References Cited

U.S. PATENT DOCUMENTS

| | | | | |
|---|---|---|---|---|
| 2006/0179181 A1* | 8/2006 | Seong | ................ | G06F 13/28 710/22 |
| 2008/0040530 A1* | 2/2008 | Takeda | ................ | G06F 13/28 710/308 |
| 2010/0149376 A1* | 6/2010 | Kiba | ................ | H04N 5/3765 348/231.2 |
| 2010/0214441 A1* | 8/2010 | Yanada | ................ | H04N 5/232 348/231.2 |
| 2010/0228863 A1* | 9/2010 | Kawauchi | ........... | H04L 65/1083 709/227 |
| 2013/0013832 A1* | 1/2013 | Tanaka | ................ | G06F 13/14 710/119 |
| 2013/0124765 A1* | 5/2013 | Nakazono | ............... | G06F 13/00 710/110 |
| 2013/0124929 A1* | 5/2013 | Harada | ................ | G06F 11/00 714/49 |
| 2015/0070527 A1* | 3/2015 | Yanada | ................ | H04N 5/3765 348/222.1 |
| 2015/0339546 A1* | 11/2015 | Ito | ........................ | G06K 15/181 358/1.15 |

FOREIGN PATENT DOCUMENTS

JP           2015-53643 A     3/2015
WO         2008/099685 A1   8/2008

OTHER PUBLICATIONS

Office Action dated May 28, 2019, issued in counterpart JP Applicatin No. 2015-120074, with English translation (5 pages).

* cited by examiner

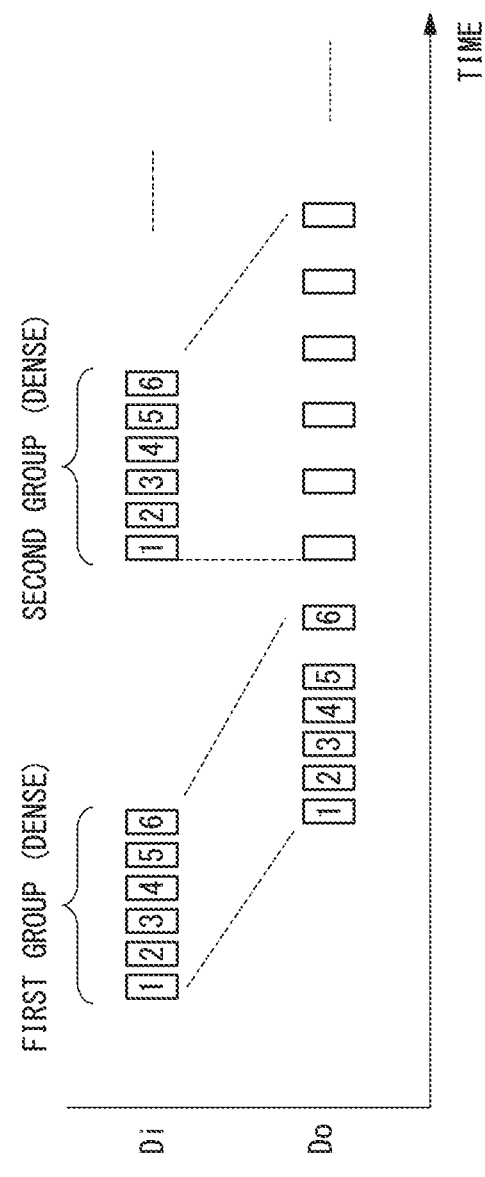

DATA TRANSFER DEVICE AND DATA TRANSFER METHOD HAVING A SHORTER TIME INTERVAL BETWEEN PIECES OF FINAL TRANSFER DATA IN A FRAME IMAGE

This application is a continuation application based on a PCT International Application No. PCT/JP2016/066585, filed on Jun. 3, 2016, whose priority is claimed on Japanese Patent Application No. 2015-120074, filed on Jun. 15, 2015. The contents of both of the PCT International Application and the Japanese Patent Application are incorporated herein by reference.

BACKGROUND OF THE INVENTION

Field of the Invention

The present invention relates to a data transfer device and a data transfer method.

Description of Related Art

In the related art, an imaging system such as a digital camera includes a plurality of large scale integrations (LSIs) to which various functional blocks are assigned. The plurality of LSIs are connected to a common bus for direct memory access (DMA). The plurality of functional blocks respectively assigned to the plurality of LSIs share one dynamic random access memory (DRAM) via the common bus. Since the plurality of functional blocks share the common bus, a bus arbiter is included in such a type of imaging system.

In general, according to the arbitration performed by the bus arbiter, when a high-priority functional block consecutively outputs a DMA transfer request, a situation may occur in which bus ownership dose not pass to other functional blocks and processes of the other functional block are stagnated. The related art for solving this problem includes a technology disclosed in Japanese Unexamined Patent Application, First Publication No. 2006-39672. In the technology of Japanese Unexamined Patent Application, First Publication No. 2006-39672, a high-priority functional block outputs a DMA transfer request at regular time intervals to smooth a band of the common bus. Accordingly, when a DMA transfer request of a high-priority functional block is continuous, the bus arbiter is enabled to receive a DMA transfer request of another low-priority functional block.

According to the technology of Japanese Unexamined Patent Application, First Publication No. 2006-39672, as a result of smoothing the common bus, a situation may occur that transfer data of a certain frame may interfere with transfer data of the next frame on the common bus such that a process of transferring transfer data is difficult. Such a situation will be described in detail with reference to FIGS. 6 and 11. FIG. 6 is a diagram showing an example of a plurality of consecutive frame images that are transfer targets. In FIG. 6, a plurality of frame images P1, P2, . . . consecutive in time are shown. The frame images P1, P2, . . . are sequentially transferred in this order. In the frame image P1, there are image areas A11 to A13 in which transfer data is densely included. In the frame image P2, there are image areas A21 to A23 in which transfer data is densely included. In the example shown in FIG. 6, there is an image area A13 in which data that is a transfer target is densely included on the lower side of the beginning frame image P1, and there is the image area A21 in which data that is a transfer target is densely included on the upper side of the next frame image P2.

A case in which data in a third group included in the image area A13 is transferred lastly among the image areas of a beginning frame image P1 transferred in a process of sequentially transferring the plurality of frame images P1, P2, . . . shown in FIG. 6 will be described. FIG. 11 is a diagram showing a relationship between pieces of transfer data between frames. In FIG. 11, a first frame corresponds to the frame image P1, and a second frame corresponds to the frame image P2. Further, a first group of the first frame corresponds to the image area A11, a second group corresponds to the image area A12, and a third group corresponds to the image area A13. A first group of the second frame corresponds to the image area A21. In FIG. 11, input image data Di(1) to Di(6) and corresponding output transfer data Do(1) to Do(6) included in the respective groups (image areas) are shown.

If the band of the common bus is smoothed when data of the third group is transferred, data Do(6) included in the third group (the image area A13) of the beginning first frame (the frame image P1) interferes with, for example, data Do(1) included in the first group (the image area A21) of the next second frame (the frame image P2) on the common bus, as shown in FIG. 11. That is, the transfer data is output to the common bus across the frame, and the data interferes between the frames. As a result, a process using the transfer data transferred over the common bus may be stagnated.

SUMMARY OF THE INVENTION

According to a first aspect of the present invention, a data transfer device includes a buffer unit configured to temporarily store transfer data that is transferred to a common bus; a write control unit configured to write input data as the transfer data to the buffer unit; a read control unit configured to read the transfer data from the buffer unit; an interface unit configured to transfer the transfer data to the common bus according to a predetermined bus protocol, the transfer data being read from the buffer unit by the read control unit; and a band-smoothing unit configured to smooth a band of the common bus by switching between the time intervals between pieces of the transfer data based on a position of the transfer data in a frame image, during a period when the transfer data is transferred to the common bus.

According to a second aspect of the present invention, in the data transfer device of the first aspect, the band-smoothing unit may switch between the time intervals based on coordinates information indicating the position of the transfer data in the frame image.

According to a third aspect of the present invention, in the data transfer device of the first aspect or the second aspect, the band-smoothing unit may include a first parameter corresponding to the time interval when the transfer data except the final transfer data included in the frame image is transferred, and a second parameter corresponding to the time interval when the final transfer data is transferred, the band-smoothing unit may set the time interval using the first parameter when the position of the transfer data in the frame image is a position of transfer data other than the final transfer data, the band-smoothing unit may set the time interval using the second parameter when the position of the transfer data in the frame image is a position of the final transfer data, and the time interval that is set using the second parameter may be shorter than the time interval that is set using the first parameter.

According to a fourth aspect of the present invention, in the data transfer device of any one of the first to third aspects, the data transfer device may further include a determination unit configured to determine a remaining capacity of the buffer unit, wherein the band-smoothing unit may adjust the time interval in response to a result of the determination of the determination unit.

According to a fifth aspect of the present invention, in the data transfer device of the fourth aspect, the band-smoothing unit may decrease the time interval as the remaining capacity of the buffer unit is small.

According to a sixth aspect of the present invention, a data transfer method includes a first step of writing input data to a buffer unit as transfer data that is transferred to a common bus; and a second step of reading the transfer data from the buffer unit, and transferring the transfer data read from the buffer unit to the common bus according to a predetermined bus protocol, wherein the second step includes a step of smoothing a band of the common bus by switching between time intervals between pieces of transfer data when the transfer data is transferred to the common bus based on a position of the transfer data in a frame image.

BRIEF DESCRIPTION OF DRAWINGS

FIG. 8B is a diagram showing an operation of the data transfer device according to the first embodiment of the present invention, and is a diagram showing a relationship between input data and output data when it takes a long time to receive a DMA transfer request.

DETAILED DESCRIPTION OF THE INVENTION

Hereinafter, embodiments of the present invention will be described with reference to the drawings.

First Embodiment

A first embodiment of the present invention will first be described.

Figure 1:
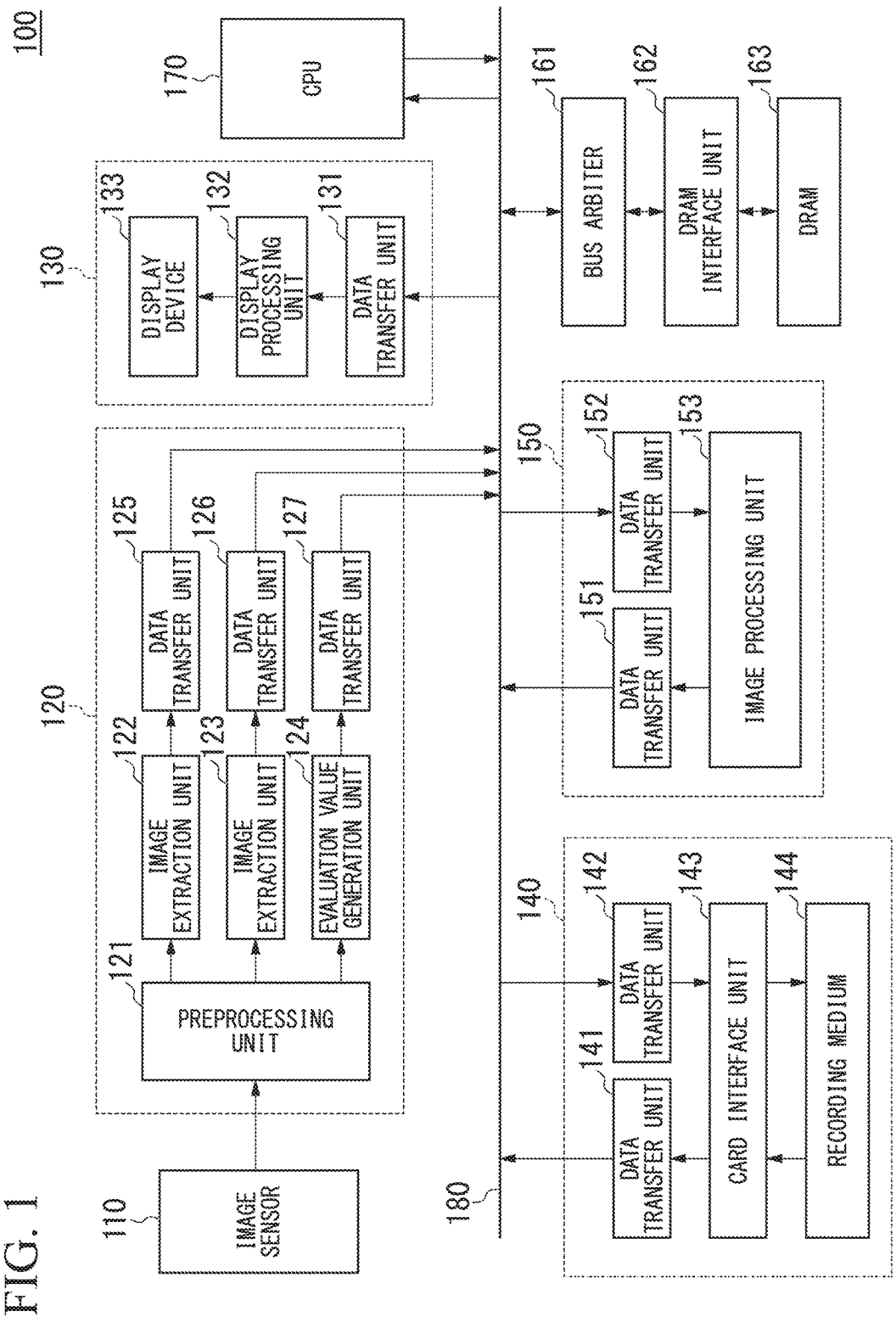
FIG. 1 is a block diagram showing a configuration example of an imaging system to which a data transfer device according to a first embodiment of the present invention has been applied.

FIG. 1 is a block diagram showing a configuration example of an imaging system 100 in which a data transfer device according to an embodiment of the present invention has been applied.

The imaging system 100 is, for example, a digital camera. The imaging system 100 includes an image sensor 110, functional blocks 120 to 150, a bus arbiter 161, a DRAM interface unit 162, a DRAM 163, a central processing unit (CPU) 170, and a common bus 180. In FIG. 1, an optical system or the like for forming an optical image of a subject on an imaging surface of the image sensor 110 will be omitted.

The image sensor 110 photoelectrically converts an optical image of the subject to generate pixel data (pixel signal). The image sensor 110 is, for example, a Charge Coupled Device (CCD) image sensor or a Complementary Metal Oxide Semiconductor (CMOS) image sensor. The image sensor 110 outputs, for example, image data of an RGB color system.

The functional block 120 functions as a bus interface for outputting the image data obtained by the image sensor 110 to the common bus 180. The functional block 120 includes a preprocessing unit 121, image extraction units 122 and 123, an evaluation value generation unit 124, and data transfer units 125 to 127. The preprocessing unit 121 performs preprocessing such as scratch correction or shading correction on the image data obtained by the image sensor 110.

The image extraction units 122 and 123 extract image data such as a display image and a recording image from the image data obtained by the image sensor 110 by cutting out a part of the image data obtained by the image sensor 110. The evaluation value generation unit 124 generates an evaluation value that is used for control of exposure, white balance, focus, or the like. The data transfer unit 125 transfers the image data extracted by the image extraction unit 122 to the common bus 180. The data transfer unit 126 transfers the image data extracted by the image extraction unit 123 to the common bus 180. The data transfer unit 127 transfers the evaluation value generated by the evaluation value generation unit 124 to the common bus 180.

The functional block 130 displays an image. The functional block 130 includes a data transfer unit 131, a display processing unit 132, and a display device 133. The data transfer unit 131 transfers image data of an image (hereinafter referred to as display image) that is displayed on the display device 133 from the common bus 180 to the display processing unit 132. The display processing unit 132 acquires the image data of the display image from the DRAM 163 and the display processing unit 132 performs a displaying process such as an on screen display (OSD) superimposition process on the image data. The display device 133 visualizes the image data processed by the display processing unit 132. The display device 133 is, for example, a Thin Film Transistor (TFT) liquid crystal device or an organic Electro Luminescence (EL) display device.

The functional block 140 stores the image data. The functional block 140 includes data transfer units 141 and 142, a card interface unit 143, and a recording medium 144. The data transfer unit 141 transfers image data supplied from the card interface unit 143 to the common bus 180. The data transfer unit 142 transfers the image data supplied from the common bus 180 to the card interface unit 143. The card interface unit 143 reads the image data from the DRAM 163, writes the image data to the recording medium 144, reads the image data from the recording medium 144, and writes the image data to the DRAM 163. The recording medium 144 is, for example, a memory card that is detachable from the card interface unit 143, such as a Secure Digital (SD) card and a Compact Flash (CF).

The functional block 150 performs predetermined image processing such as a noise removal process, a YC conversion process, a resizing process, and a JPEG compression process on the image data (preprocessed image data) stored in the DRAM 163 to generate a display image or a recording image. The functional block 150 includes data transfer units 151 and 152 and an image processing unit 153. The data transfer unit 151 transfers the image data supplied from the image processing unit 153 to the common bus 180. The data transfer unit 152 transfers the image data supplied from the common bus 180 to the image processing unit 153. The image processing unit 153 performs the predetermined image processing. The image data subjected to the predetermined image processing by the image processing unit 153 is transferred to and stored in the DRAM 163.

The bus arbiter 161 performs arbitration and the bus arbiter 161 receives the DMA transfer request output from the functional blocks 120 to 150 connected to the common bus 180. The bus arbiter 161 determines a functional block to which the bus ownership for permitting access to the DRAM 163 is granted. The DRAM interface unit 162 performs writing of image data to the DRAM 163 and reading of image data from the DRAM 163. The DRAM 163 is a semiconductor memory shared among the functional blocks 120 to 150. The DRAM 163 is, for example, a synchronous DRAM.

The central processing unit 170 controls an entire operation of the imaging system 100. The central processing unit 170 is also one of the functional blocks sharing the DRAM 163, similar to the functional blocks 120 to 150 described above.

The data transfer device according to the first embodiment corresponds to the data transfer units 125, 126, 127, 141, and 151 that output the image data to the common bus 180 among the data transfer units 125, 126, 127, 131, 141, 142, 151, and 152 included in the imaging system 100 described above. The following description focuses on the data transfer unit 125 included in the functional block 120, and the data transfer unit 125 is referred to as a "data transfer device 10".

The data transfer device according to the first embodiment is also applicable to all of the data transfer units included in the imaging system 100 shown in FIG. 1, and may be applicable to only some of the data transfer units.

Figure 2:
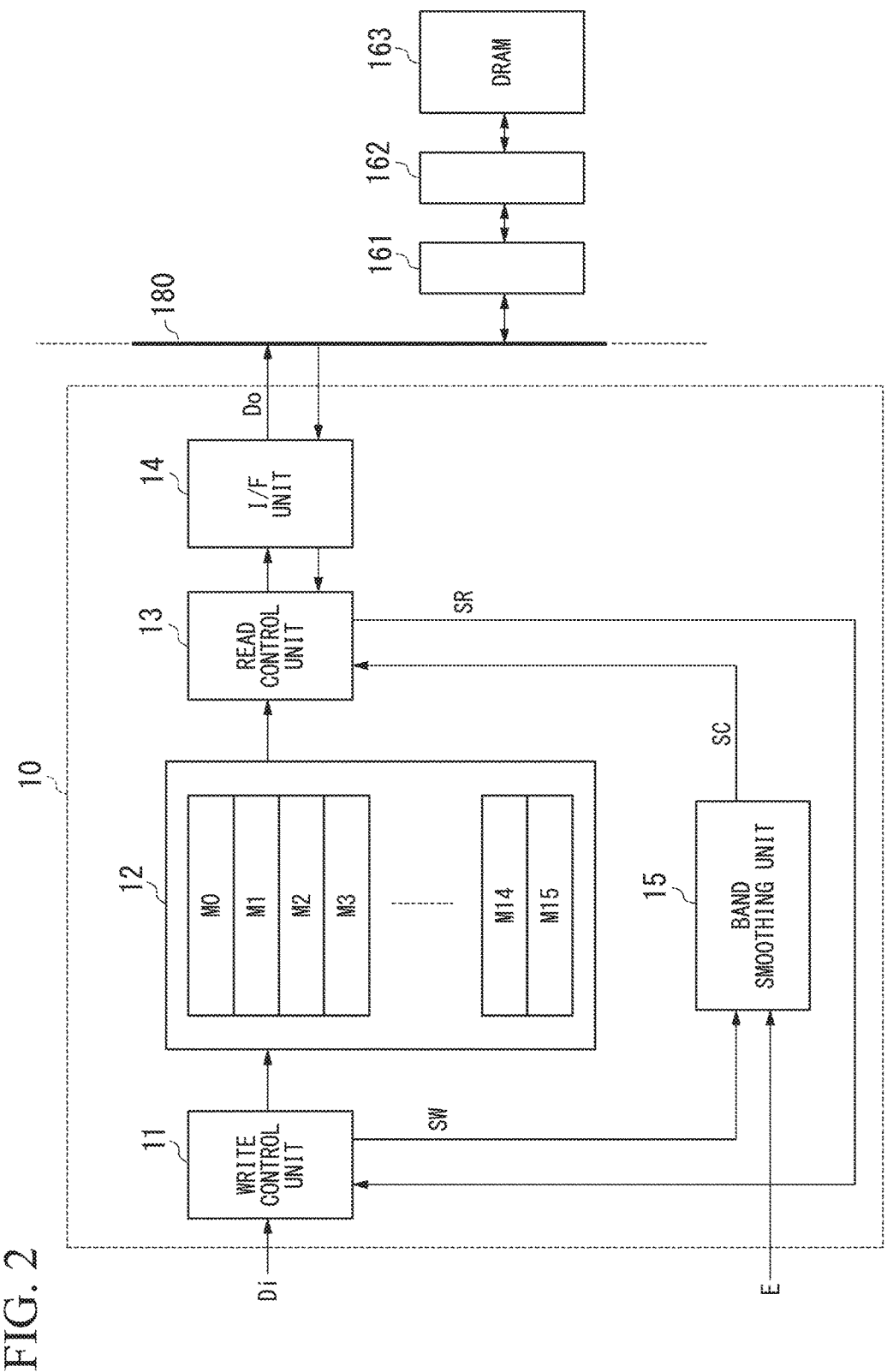
FIG. 2 is a block diagram showing a configuration example of the data transfer device according to the first embodiment of the present invention.

FIG. 2 is a block diagram showing a configuration example of the data transfer device 10 according to the first embodiment of the present invention.

The data transfer device 10 includes a write control unit 11, a buffer unit 12, a read control unit 13, an interface unit (I/F unit) 14, and a band-smoothing unit 15.

The band-smoothing unit 15 and the write control unit 11 may be integrated, and the band-smoothing unit 15 and the read control unit 13 may be integrated. Further, the read control unit 13 and the interface unit 14 may be integrated.

The write control unit 11 sequentially writes the input image data Di to the storage areas M0 to M15 of the buffer unit 12 as the transfer data, wherein the input image data Di is formed from a data array of the pixel data acquired by the image sensor 110. The write control unit 11 outputs a write completion notification signal SW each time writing of the pixel data (for example, the pixel data corresponding to 32 pixels) corresponding to a predetermined number of pixels forming the input image data Di is completed, wherein the write completion notification signal SW indicates that the input image data Di has been written to the buffer unit 12. Address information indicating any one of the storage areas M0 to M15 to which the input image data Di has been written is included in the write completion notification signal SW. In the first embodiment, the write control unit 11 outputs the write completion notification signal SW each time writing of the pixel data corresponding to the 32 pixels forming the input image data Di is completed, but the present invention is not limited to this example.

When the write control unit 11 receives the read completion notification signal SR from the read control unit 13 to be described below, the write control unit 11 specifies the storage area (that is, a blank storage area) from which the transfer data has been read, among the storage areas M0 to M15 of the buffer unit 12 based on the read completion notification signal SR. The write control unit 11 writes the input image data Di to the blank storage area of the buffer unit 12.

The buffer unit 12 temporarily stores the transfer data that is transferred to the common bus 180. The buffer unit 12 includes, for example, a static random access memory (SRAM). In the first embodiment, the buffer unit 12 includes a total of 16 storage areas M0 to M15. The pixel data corresponding to the predetermined number of pixels forming the input image data Di is stored as transfer data in each storage area. In the first embodiment, pixel data corresponding to 32 pixels is stored in each of the storage areas M0 to M15. When the pixel data for one pixel is 2 bytes, 64 (=2×32) bytes of pixel data are stored in each of the storage areas M0 to M15. Therefore, each of the storage areas M0 to M15 has a storage capacity of at least 64 bytes.

The buffer unit 12 sequentially stores pixel data forming the input image data Di in units of 64 bytes from the storage area M0 to the storage area M15. Specifically, the buffer unit 12 stores 64 bytes of pixel data corresponding to the first 32 pixels forming the input image data Di in the beginning storage area M0, and stores 64 bytes of pixel data corresponding to the next 32 pixels in the storage area M1. Similarly, the buffer unit 12 sequentially stores subsequent image data forming the input image data Di in the storage areas M2 to M15 in units of 64 bytes. When the input image data Di is stored in the last storage area M15, the buffer unit 12 sequentially stores new subsequent pixel data forming the input image data Di in the respective storage areas in units of 64 bytes from the beginning storage area M0 to the storage area M15 again. That is, the respective pieces of pixel data of the input image data Di sequentially output from the image sensor 110 are cyclically written to the storage area M0 to the storage area M15 of the buffer unit 12 by the write control unit 11. In the following description, writing the pixel data to the buffer unit 12 means writing the input image data Di to the storage areas M0 to M15 in units of 64 bytes corresponding to 32 pixels.

Regarding the configuration of the imaging system 100, when a write clock signal for writing the input image data Di to the buffer unit 12 and a read clock signal for reading transfer data from the buffer unit 12 are different clock signals, a type of SRAM (for example, a dual port SRAM) to which the write clock signal and the read clock signal can be individually input, for example, can be used as the buffer unit 12.

The read control unit 13 reads the transfer data from the buffer unit 12 in response to a read control signal SC to be described below, the read control signal SC being output from the band-smoothing unit 15. The read control signal SC is a signal obtained by delaying the write completion notification signal SW. Thus, similar to the write completion notification signal SW, the read control signal SC includes information indicating that the input image data Di has been written to the buffer unit 12 and address information indicating the storage area to which the input image data Di has been written. When the read control unit 13 receives the read control signal SC from the band-smoothing unit 15, the read control unit 13 reads the pixel data as transfer data in units of 64 bytes corresponding to 32 pixels from the storage areas M0 to M15 of the buffer unit 12, the storage areas M0 to M15 of the buffer unit 12 being indicated by the address information included in the read control signal SC. In the following description, reading the transfer data from the buffer unit 12 means reading the pixel data as the transfer data in units of 64 bytes corresponding to the 32 pixels from the storage areas M0 to M15.

The read control unit 13 outputs the read completion notification signal SR indicating that the transfer data has been read, to the write control unit 11 each time reading of 64 bytes of transfer data corresponding to the 32 pixels from the buffer unit 12 is completed. Address information (that is, information indicating a blank storage area) indicating the storage area of the buffer unit 12 in which the read transfer data has been stored is included in the read completion notification signal SR.

The interface unit 14 transfers the transfer data to the common bus 180 according to a predetermined bus protocol, the transfer data being read from the buffer unit 12 by the read control unit 13. Specifically, in order to transfer the transfer data to the common bus 180, the interface unit 14 performs, for example, transmission of a DMA transfer request REQ, reception of a DMA transfer receipt ACK, transmission of an address ADD in the DRAM indicating a transfer destination of the transfer data, and transmission of a transfer data (pixel data) body.

The band-smoothing unit 15 smoothes the band of the common bus 180. The band-smoothing unit 15 smoothes the band of the common bus 180 by controlling a timing at which the read control unit 13 reads the transfer data from the buffer unit 12 based on the write completion notification signal SW, the write completion notification signal SW being input from the write control unit 11. The band-smoothing unit 15 generates the read control signal SC by delaying the write completion notification signal SW input from the write control unit 11, and the band-smoothing unit 15 outputs the read control signal SC to the read control unit 13, the read control signal SC being generated for controlling the timing of reading the transfer data from the buffer unit 12. Delaying the write completion notification signal SW means smoothing the write completion notification signal SW. Thus, the read control signal SC which is generated by delaying the write completion notification signal SW is a write completion notification signal SW after smoothing.

Specifically, the band-smoothing unit 15 sequentially outputs the write completion notification signals as the read control signal to the read control unit 13 at a predetermined time interval by delaying the write completion notification signals SW sequentially output from the write control unit 11, according to that the pixel data forming the input image data Di is sequentially written to the buffer unit 12 by the write control unit 11. A setting signal E for setting the predetermined time interval is input from the central processing unit 170 (FIG. 1) or the like to the band-smoothing unit 15. However, the setting signal E may be input directly from the outside to the band-smoothing unit 15.

In the first embodiment, an example is described that the band-smoothing unit 15 smoothes the band of the common bus 180 by controlling the timing of reading the transfer data from the buffer unit 12, however a scheme of smoothing the band of the common bus 180 can be arbitrarily selected.

The band-smoothing unit 15 switches the predetermined time interval that is used for determining a time interval between the pieces of transfer data when the transfer data is transferred to the common bus 180 to the predetermined time interval based on the position of the transfer data in the frame image that is transferred to the common bus 180. Accordingly, the band-smoothing unit 15 smoothes the band of the common bus 180. The band-smoothing unit 15 includes a first parameter, and a second parameter as parameters for setting the predetermined time interval, the first parameter corresponding to the time interval between the pieces of transfer data when transfer data other than the final transfer data included in the frame image is transferred, the second parameter corresponding to the time interval between the pieces of transfer data when the final transfer data is transferred. The time interval between the pieces of transfer data that is set using the second parameter is shorter than the time interval between the pieces of transfer data that is set using the first parameter.

When the position of the transfer data in the frame image is a position of transfer data other than the final transfer data, the band-smoothing unit 15 sets the time interval between the pieces of transfer data using the first parameter. Further, when the position of the transfer data in the frame image is the position of the final transfer data, the band-smoothing unit 15 sets the time interval between the pieces of transfer data using the second parameter. The maximum value of a count value of a counter 1503 (FIG. 3) to be described below forming the band-smoothing unit 15 is determined from the first parameter and the second parameter.

Figure 3:
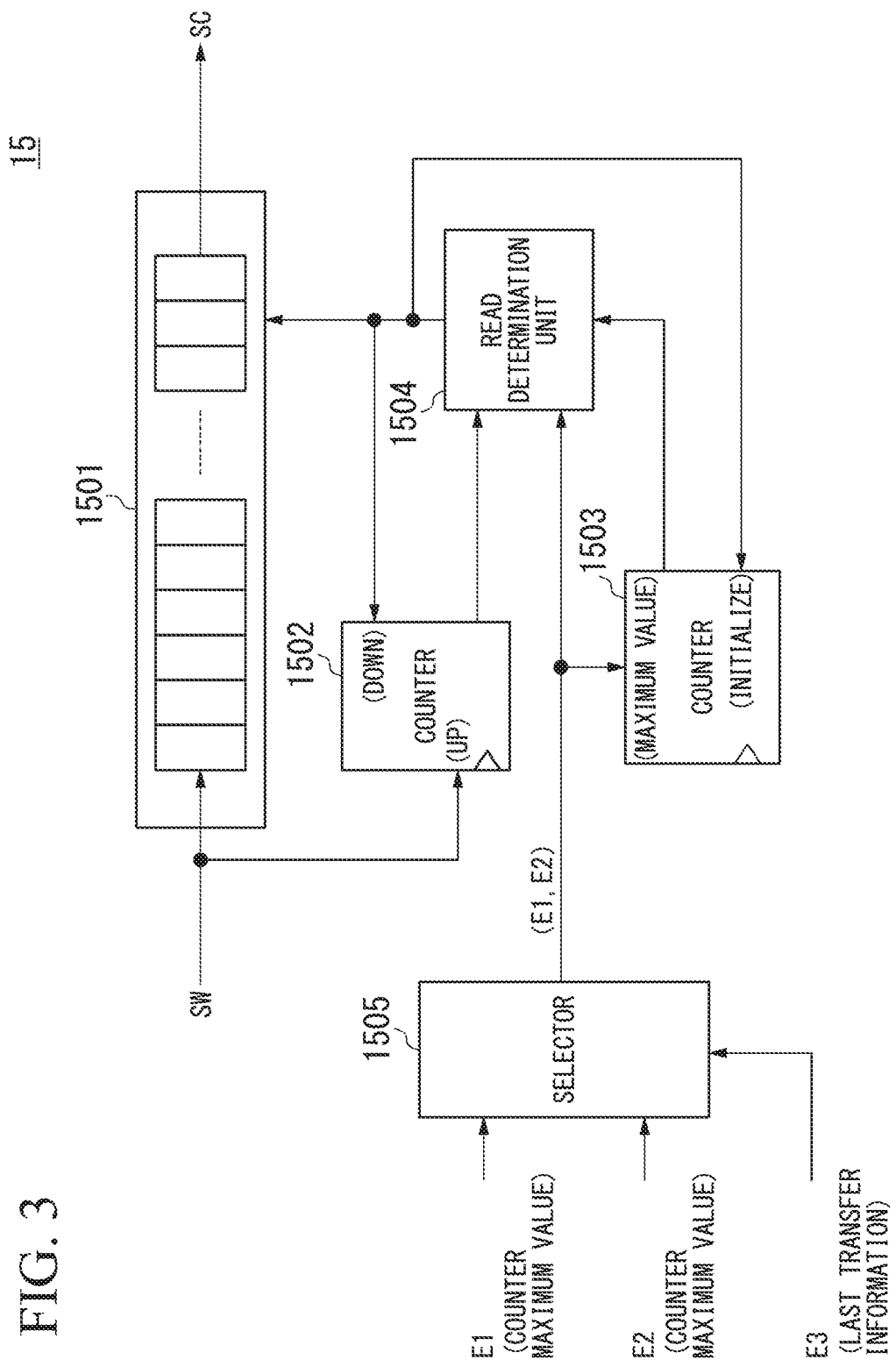
FIG. 3 is a block diagram showing a configuration example of a band-smoothing unit included in the data transfer device according to the first embodiment of the present invention.

FIG. 3 is a block diagram showing a configuration example of the band-smoothing unit 15 included in the data transfer device 10 according to the first embodiment of the present invention.

The band-smoothing unit 15 includes a First-In First-OUT (FIFO) memory 1501, counters 1502 and 1503, a read determination unit 1504, and a selector 1505. The FIFO memory 1501 temporarily holds the write completion notification signals SW sequentially output from the write control unit 11. The FIFO memory 1501 is formed from, for example, a plurality of cascaded registers. The FIFO memory 1501 delays the write completion notification signal SW by temporarily holding the write completion notification signal SW, and the FIFO memory 1501 outputs the write completion notification signal SW as the read control signal SC according to a FIFO read command input from the read determination unit 1504 to be described below.

In response to the write completion notification signals SW sequentially output from the write control unit 11, the counter 1502 counts a number of the write completion notification signals SW that have not been read from the FIFO memory 1501 among the write completion notification signals SW already held in the FIFO memory 1501. The counter 1502 counts up each time the write completion notification signal SW is input from the write control unit 11 to the FIFO memory 1501 such that a counter value increases by one at each time. The counter 1502 counts down each time the write completion notification signal SW is read from the FIFO memory 1501.

The count value of the counter 1502 indicates a difference (a natural number including zero) between the number of write completion notification signals SW input to the FIFO memory 1501 and the number of write completion notification signals SW output from the FIFO memory 1501. Therefore, the presence or absence of write completion notification signals SW not read from the FIFO memory 1501 can be recognized from the count value of the counter 1502. When the count value of the counter 1502 is a value equal to or greater than 1, a write completion notification signal SW not read from the FIFO memory 1501 is present in the FIFO memory 1501. Further, when the count value of the counter 1502 is 0, the write completion notification signals SW input to the FIFO memory 1501 have all been read and a write completion notification signal SW not read from the FIFO memory 1501 is not present in the FIFO memory 1501.

The counter 1503 counts up at a predetermined period until the count value reaches the maximum value of the count value that is set in the counter 1503 using the setting signal E1 or the setting signal E2 supplied from the selector 1505. When the count value of the counter 1503 reaches a maximum value which is set based on the setting signal E1 or the setting signal E2, the counter 1503 outputs a signal indicating that the count value has reached the maximum value to the read determination unit 1504 and, then, the counter 1503 is initialized at a read timing of the FIFO memory 1501. That is, the count value of the counter 1503 is initialized each time the write completion notification signal SW is read from the FIFO memory 1501. Specifically, when the read determination unit 1504 outputs a FIFO read command, the counter 1503 is initialized in response to the FIFO read command. After the counter 1503 has been initialized, the counter 1503 repeatedly counts up until the count value reaches the maximum value or until the counter 1503 is initialized again.

A time interval Ts between the read control signals SC sequentially output from the band-smoothing unit 15 is determined based on the maximum value of the count value set in the counter 1503 using the setting signals E1 and E2. Here, the setting signal E1 corresponds to the first parameter described above, and the setting signal E2 corresponds to the second parameter described above. As the maximum value of the count value set in the counter 1503 is increased, the time interval Ts between the read control signals SC (FIG. 7) is increased. In this case, the smoothing of the band of the common bus 180 advances, but the data transfer speed is decreased. Conversely, as the maximum value is decreased, the time interval between the read control signals SC is decreased. In this case, the data transfer speed is increased, but smoothing of the common bus 180 of the band is reduced. The maximum value of the count value set in the counter 1503 can be arbitrarily set according to the required data transfer speed, the degree of smoothing of the band of the common bus 180, or the like. However, in the first embodiment, the maximum value of the count value set in the counter 1503 is set to any one of two values respectively corresponding to the setting signal E1 and the setting signal E2 supplied from the selector 1505.

The read determination unit 1504 controls reading of the FIFO memory 1501 based on the count values of the counters 1502 and 1503. That is, when the count value of the counter 1503 reaches a predetermined value determined based on the maximum value, and the count value of the counter 1502 is a value indicating that a write completion notification signal SW not read from the FIFO memory 1501 is present in the FIFO memory 1501, the read determination unit 1504 outputs a FIFO read command for instructing reading of the write completion notification signal SW to the FIFO memory 1501.

The read determination unit 1504 reads and outputs the write completion notification signal SW which has not been read from the FIFO memory 1501 as the read control signal SC from the FIFO memory 1501, by outputting a FIFO read command to the FIFO memory 1501. In this case, the read control signals SC are sequentially output at a predetermined time interval Ts (FIG. 7) from the FIFO memory 1501 of the band-smoothing unit 15 to the read control unit 13, the predetermined time interval Ts being determined by the maximum value of the count value set in the counter 1503. Thus, by inputting the read control signal SC to the read control unit 13 at the time interval Ts, the band of the common bus 180 is smoothed as will be described below.

The selector 1505 selects any one of the setting signals E1 and E2 for setting the maximum value of the count value of the counter 1503 and supplies the setting signal to the counter 1503. For example, setting signals E1 and E2 of two types may be input from the central processing unit 170 shown in FIG. 1 to the selector 1505. The first parameter and the second parameter described above for setting the maximum value of the count value of the counter 1503 are determined based on the setting signals E1 and E2, respectively.

The maximum value of the count value set using the setting signal E2 (second parameter) is smaller than the maximum value of the count value set using the setting signal E1 (first parameter). Therefore, when the maximum value of the count value of the counter 1503 is set using the setting signal E2, the time interval Ts of the DMA transfer request REQ is shorter than that when the maximum value of the count value of the counter 1503 is set using the setting signal E1.

Figure 5A:
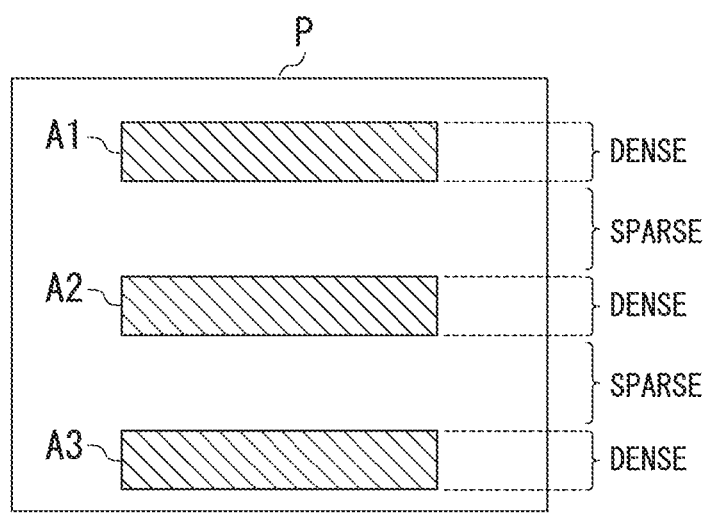
FIG. 5A is a diagram showing an operation of the data transfer device according to the first embodiment of the present invention, and is a diagram showing an example of image data that is a transfer target.
Figure 10:
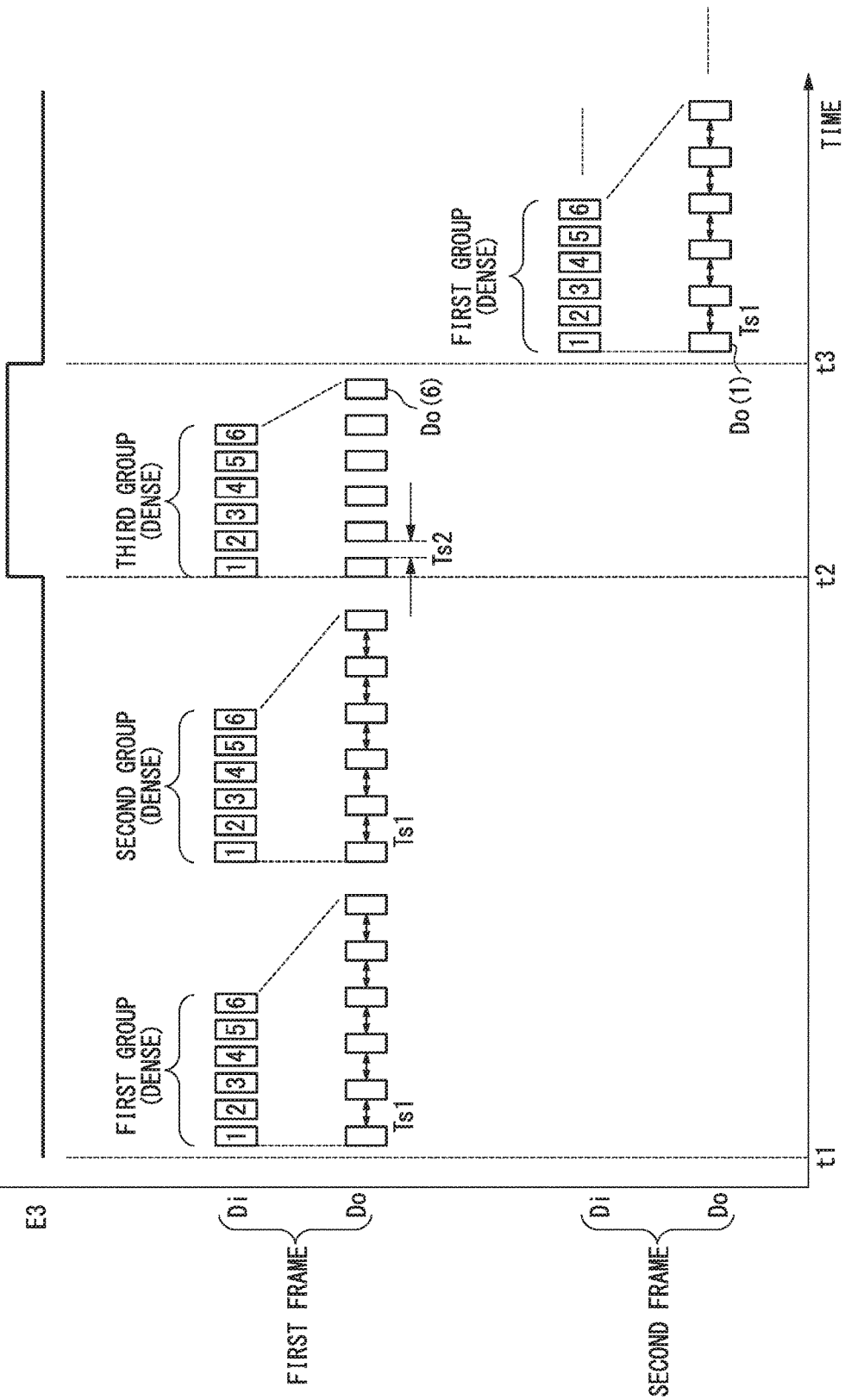
FIG. 10 is a diagram showing an operation of the data transfer device according to the first embodiment of the present invention, and is a diagram showing a relationship between pieces of transfer data between frames.

A setting signal E3 is input from the image extraction unit 122 shown in FIG. 1 to the selector 1505. The setting signal E3 is a final transfer information signal indicating that the transfer data read from the buffer unit 12 by the read control unit 13 is the final transfer data, that is, the position of the transfer data in the frame image read from the buffer unit 12 is the position of the final transfer data in the frame image. In the first embodiment, the setting signal E3 is a signal indicating a set of data that becomes a transfer target in the frame last among sets of data densely included in each frame image. Specifically, as shown at the top of FIG. 10, the setting signal E3 is, for example, a signal transitioning from a low level to a high level when data (third group) densely included in the image area A3 on the lower side shown in FIG. 5A is transferred. In the first embodiment, an existing signal that the image extraction unit 122 generates in performing the image extraction process is used as the setting signal E3.

When the position of the transfer data indicated using the setting signal E3 indicates the position of the final transfer data in the frame image, the selector 1505 selects the setting signal E2 and the selector 1505 outputs the setting signal E2 to the counter 1503 and the read determination unit 1504. In the other case, that is, when the position of the transfer data indicated using the setting signal E3 indicates a position of transfer data other than the final transfer data in the frame image, the selector 1505 selects the setting signal E1 and outputs the setting signal E1 to the counter 1503 and the read determination unit 1504.

Next, an operation (data transfer method) of the data transfer device 10 according to the first embodiment will be described with reference to FIGS. 5A to 11 along the flow shown in FIG. 4.

Here, for ease of understanding, an operation of the data transfer device 10 will be described by being separated into an operation when transfer data is not the final transfer data in the frame image and an operation when the transfer data is the final transfer data in the frame image. The "final transfer data" in the frame image refers to a set of data that becomes a transfer target last in time among sets of data densely included in the frame image, for example, the "final transfer data" is a set of data included in the image area A3 that becomes a transfer target last among image areas A1 to A3 of frame images forming an imaging screen P shown in FIG. 5A.

Figure 4:
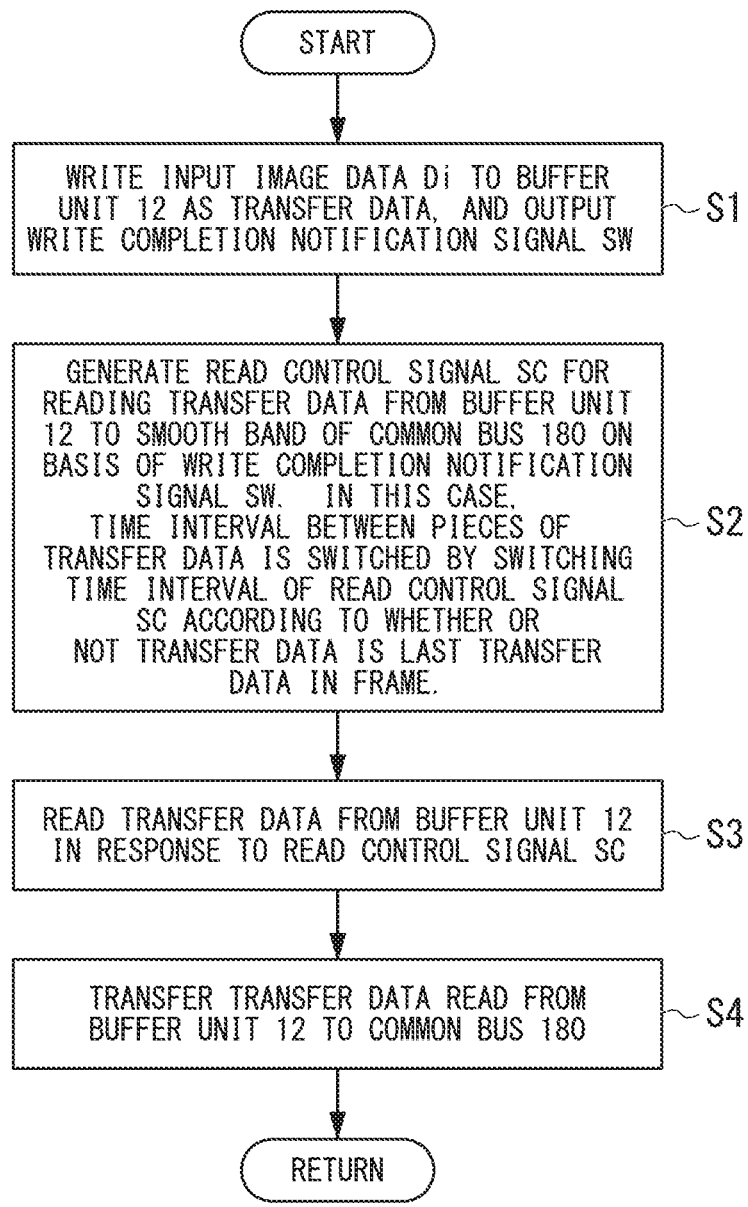
FIG. 4 is a flowchart showing an example of an operation flow of the data transfer device according to the first embodiment of the present invention.
Figure 6:
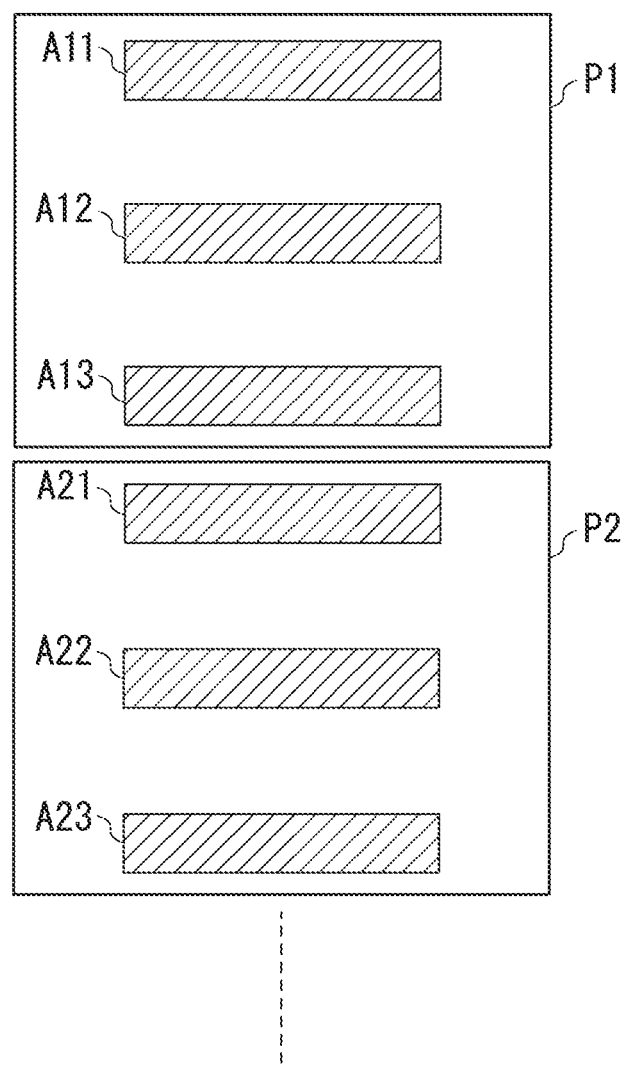
FIG. 6 is a diagram showing an operation of the data transfer device according to the first embodiment of the present invention, and is a diagram showing an example of a plurality of consecutive frame images that are transfer targets.
Figure 7A:
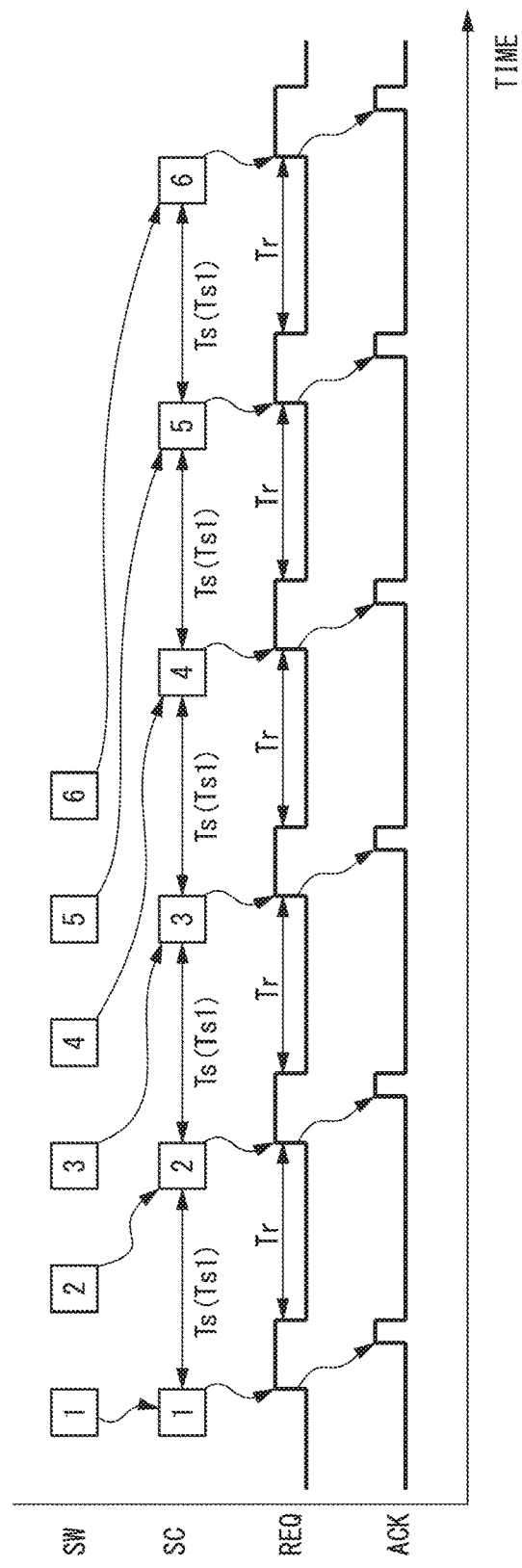
FIG. 7A is a diagram showing an operation of the data transfer device according to the first embodiment of the present invention, and is a timing chart showing an operation when data other than final transfer data is transferred.
Figure 7B:
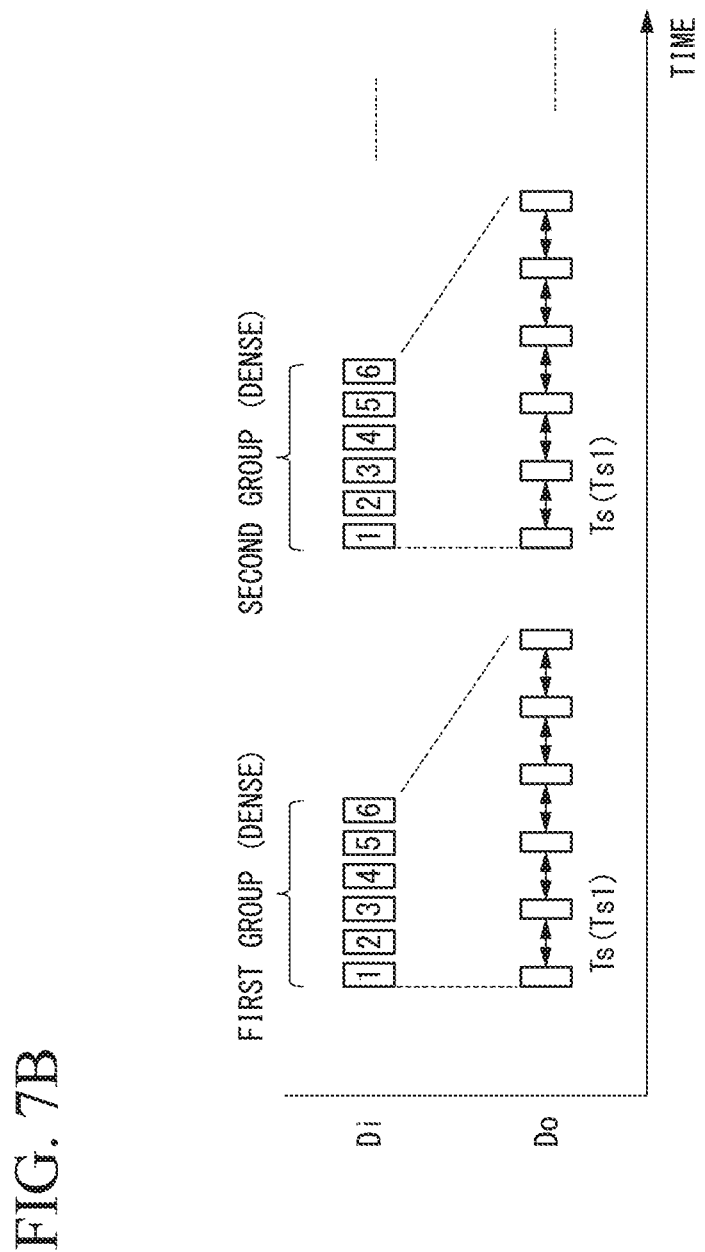
FIG. 7B is a diagram showing an operation of the data transfer device according to the first embodiment of the present invention, and is a diagram showing a relationship between input data and output data when data other than final transfer data is transferred.
Figure 8A:
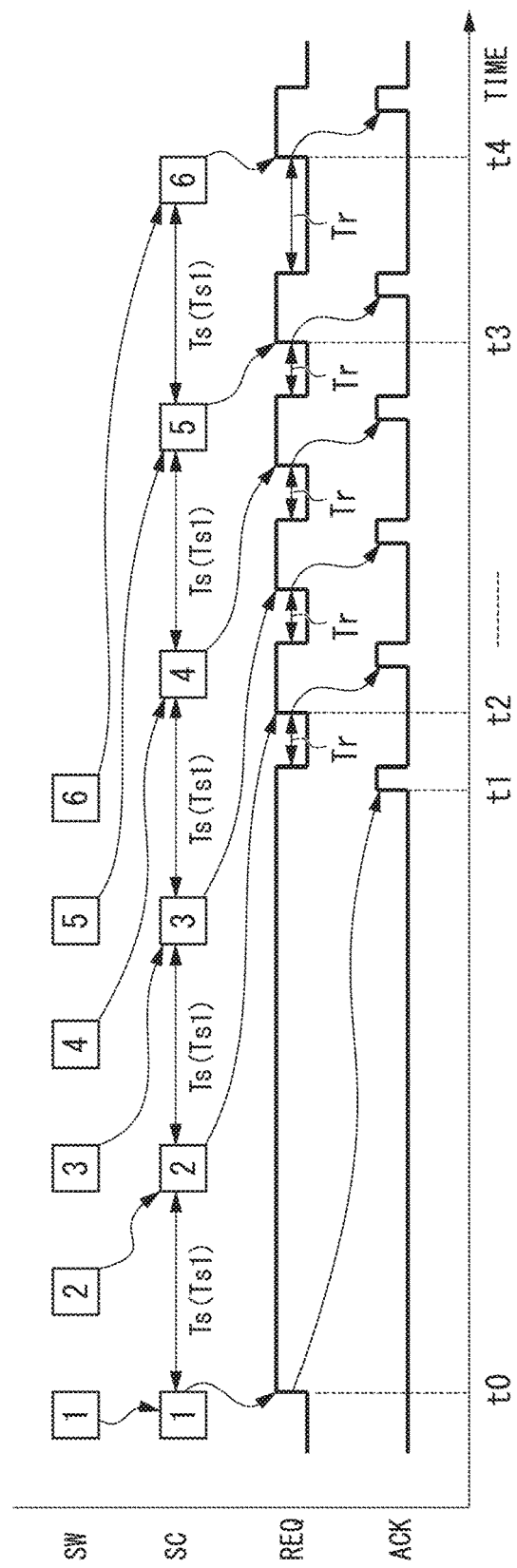
FIG. 8A is a diagram showing an operation of the data transfer device according to the first embodiment of the present invention, and is a timing chart showing an operation when it takes a long time to receive a DMA transfer request.
Figure 9A:
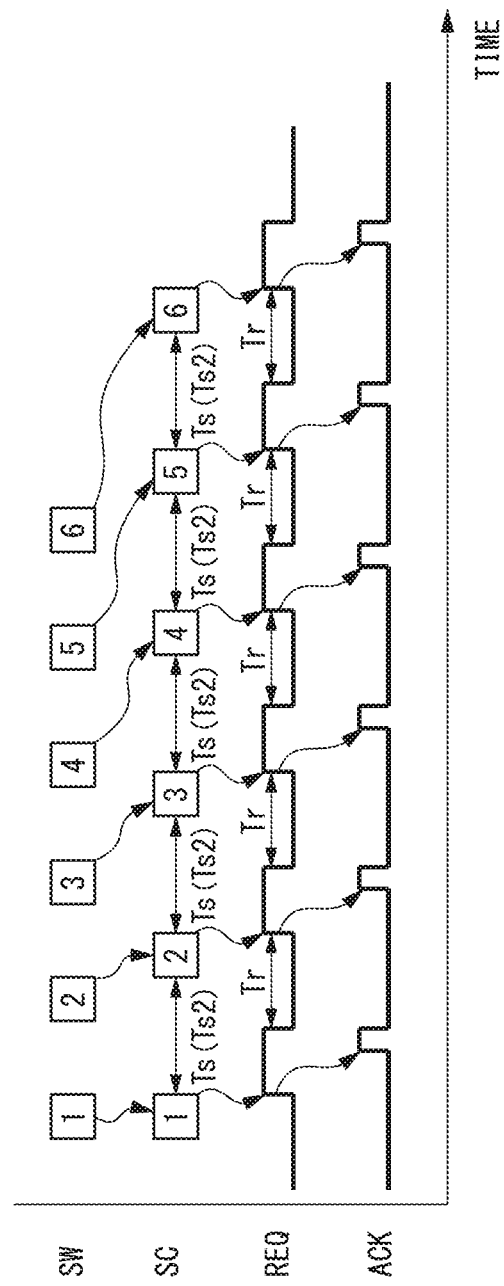
FIG. 9A is a diagram showing an operation of the data transfer device according to the first embodiment of the present invention, and is a timing chart showing an operation when final transfer data is transferred.
Figure 9B:
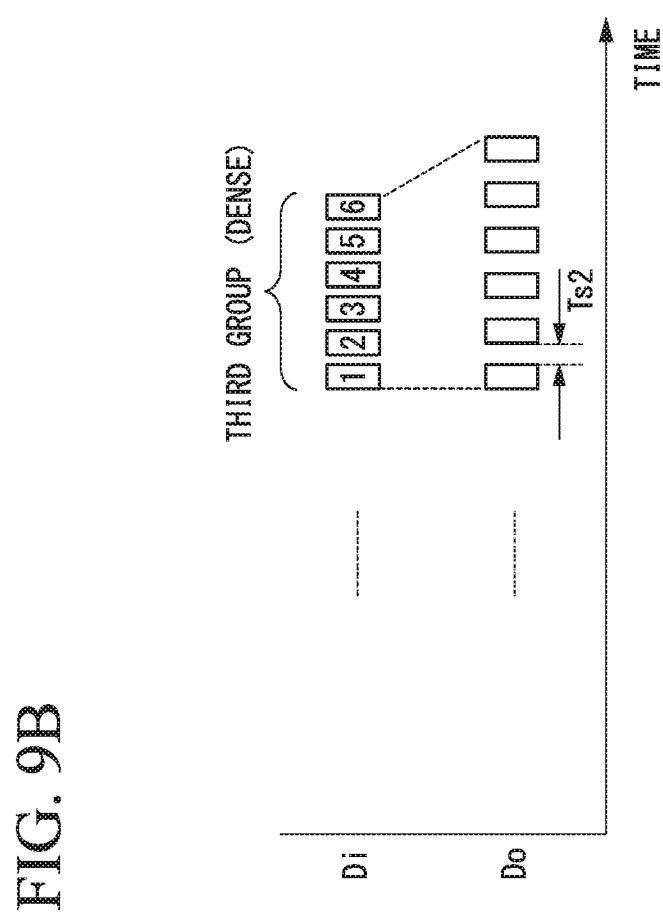
FIG. 9B is a diagram showing an operation of the data transfer device according to the first embodiment of the present invention, and is a diagram showing a relationship between input data and output data when final transfer data is transferred.
Figure 11:
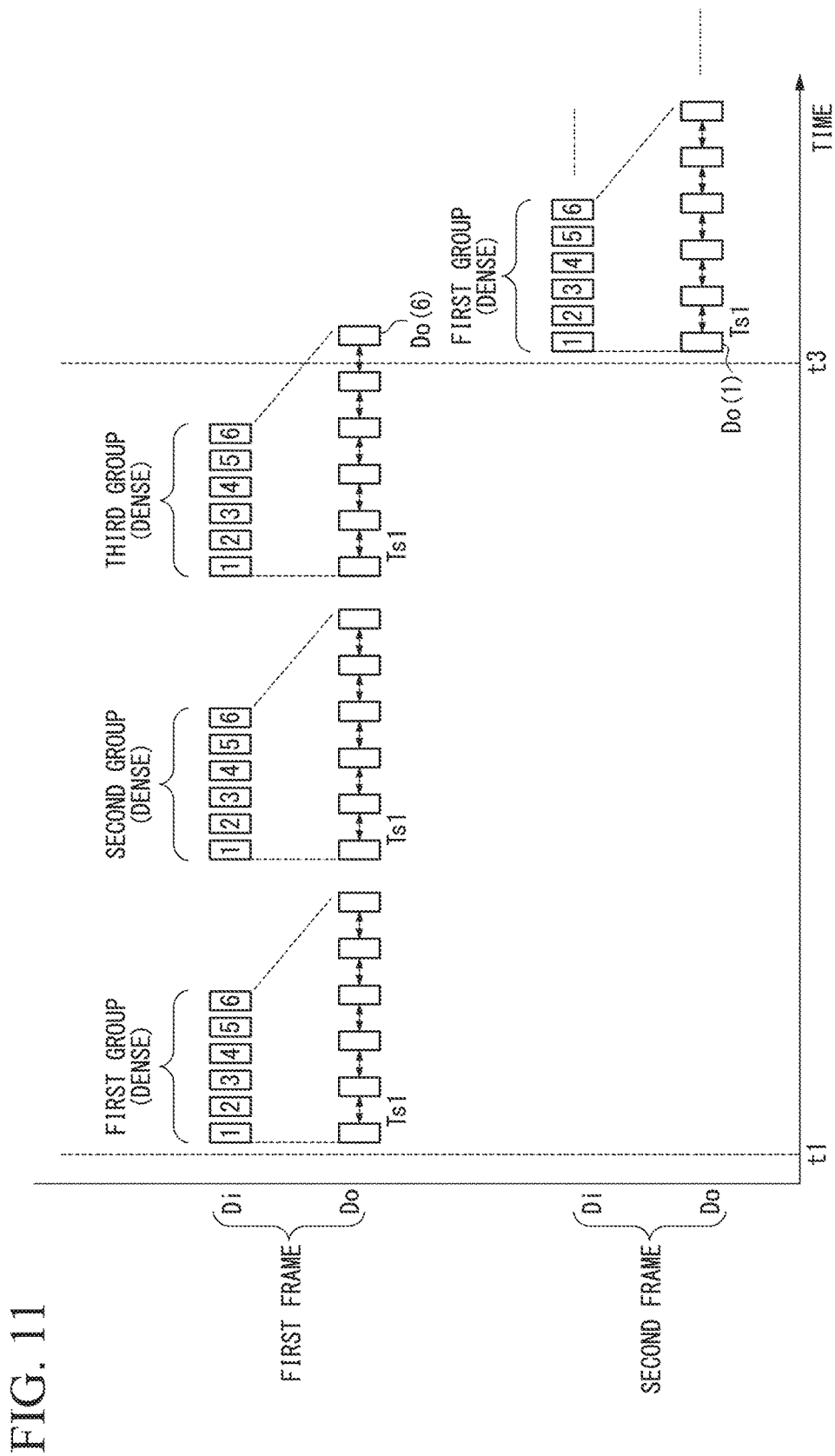
FIG. 11 is a diagram supplementarily showing an operation of the data transfer device according to the first embodiment of the present invention, and is a diagram showing a relationship between pieces of transfer data between frames when a time interval between pieces of transfer data is not switched.

FIG. 4 is a flowchart showing an example of an operation flow of the data transfer device 10 according to the first embodiment of the present invention. FIGS. 5A to 5D are diagrams showing an operation of the data transfer device 10 according to the first embodiment of the present invention and are diagrams showing examples of image data that is a transfer target. FIG. 6 is a diagram showing an operation of the data transfer device 10 according to the first embodiment of the present invention and is a diagram showing an example of a plurality of consecutive frame images that are transfer targets. FIGS. 7A and 7B are diagrams showing an operation of the data transfer device 10 according to the first embodiment of the present invention. FIG. 7A is a timing chart showing an operation when data other than final transfer data is transferred. FIG. 7B is a diagram showing a relationship between the input image data Di and the output transfer data Do when data other than final transfer data is transferred. FIGS. 8A and 8B are diagrams showing an operation of the data transfer device 10 according to the first embodiment of the present invention. FIG. 8A is a timing chart showing an operation when it takes a long time to receive the DMA transfer request. FIG. 8B is a diagram showing a relationship between the input image data Di and the output transfer data Do when it takes a long time to receive the DMA transfer request. FIGS. 9A and 9B are diagrams showing an operation of the data transfer device 10 according to the first embodiment of the present invention. FIG. 9A is a timing chart showing an operation when final transfer data is transferred. FIG. 9B is a diagram showing a relationship between input data and output data when the final transfer data is transferred. FIG. 10 is a diagram showing an operation of the data transfer device 10 according to the first embodiment of the present invention, and is a diagram showing a relationship between pieces of transfer data between frames. FIG. 11 is a diagram supplementarily showing an operation of the data transfer device 10 according to the first embodiment of the present invention, and is a diagram showing a relationship between pieces of transfer data between frames when a time interval between the pieces of transfer data is not switched.

When the image extraction unit 122 extracts the image data from the input image data Di (input image data subjected to preprocessing by the preprocessing unit 121), the image extraction unit 122 determines whether or not the input image data Di is the final transfer data in the frame. The image extraction unit 122 outputs the setting signal E3 including information indicating whether or not the input image data Di is the final transfer data to the selector 1505 of the band-smoothing unit 15.

Here, an operation of the data transfer device 10 will be described by being separated into a case in which the transfer data is not the final transfer data in the frame image and a case in which the transfer data is the final transfer data in the frame image.

1. When the Transfer Data is not the Final Transfer Data in the Frame Image

When the position of the transfer data is not the position of the final transfer data in the frame image, data interference between frames cannot usually occur even when the band of the common bus is smoothed. Therefore, in this case, only an operation of smoothing the band of the common bus 180 is performed, and an operation related to the suppression of data interference between the frames is not performed.

When the position of the transfer data is not the position of the final transfer data in the frame image, the setting signal E3 supplied from the image extraction unit 122 to the band-smoothing unit 15 indicates a position other than the position of the final transfer data. In this case, the selector 1505 selects the setting signal E1 and supplies the setting signal E1 to the counter 1503. Accordingly, in this case, the maximum value of the count value of the counter 1503 becomes a value that is set based on the setting signal E1, and becomes a value greater than a value that is set based on the setting signal E2. This means that a time interval between the pieces of transfer data when the transfer data is not the final transfer data in the frame image is wider than a time interval between the pieces of transfer data when the transfer data is the final transfer data in the frame image, as described below.

Here, in order to facilitate understanding of effects according to the first embodiment, an area in which the pixel data is densely included (a dense area) and an area in which almost none pixel data is included almost none pixel data is included (a sparse area) are assumed to be present in the input image data Di. Generally, when the input image data Di in which the pixel data is densely included is transferred from a certain functional block to the common bus 180, the functional block consecutively outputs a DMA transfer request. Therefore, in a period in which the DMA transfer request is output, a situation in which the DMA transfer request of other functional blocks cannot be received by the bus arbiter may occur. In order to avoid such a situation, the band-smoothing unit 15 smoothes the band of the common bus 180 in the first embodiment.

In FIGS. 5A to 5D, an example of an imaging screen P based on the input image data Di in which there is an area in which the pixel data that is a data transfer target of the data transfer device 10 is densely included (a dense area) and an area in which almost none pixel data is included almost none pixel data is included (sparse area) is shown. The imaging screen P shown in FIG. 5A includes the image areas A1 to A3 in which capturing of an image (pixel data that is a transfer target) is performed, and image areas (areas other than the image areas A1 to A3) in which almost none image is captured. Pixel data for displaying the image areas A1 to A3 is densely included in the input image data Di acquired from the image sensor 110. In other words, the pixel data is densely included in the image areas A1 to A3 (dense areas). On the other hand, almost none pixel data for displaying areas other than the image areas A1 to A3 is included in the input image data Di. In other words, almost none pixel data is included (sparse area) in areas other than the image areas A1 to A3. Therefore, the area in which the pixel data is densely included (dense area) and the area in which almost none pixel data is included almost none pixel data is included (sparse area) are alternately present in the input image data Di that is sequentially output from the image sensor 110 along scan lines of the imaging screen P shown in FIG. 5A.

Figure 5B:
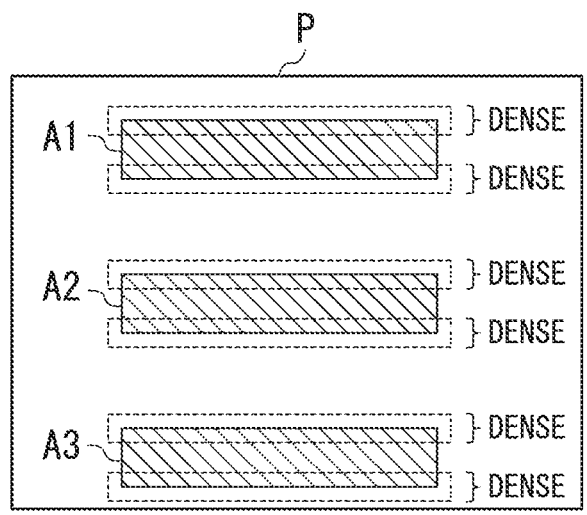
FIG. 5B is a diagram showing an operation of the data transfer device according to the first embodiment of the present invention, and is a diagram showing an example of image data that is a transfer target.

The imaging screen P shown in FIG. 5B includes image areas A1 to A3 in which capturing of an image (pixel data that is a transfer target) is performed, and image areas in which almost none image is captured (areas other than the image areas A1 to A3), similar to the example shown in FIG. 5A. However, in the example of FIG. 5B, actually, pixel data that is a transfer target is only a part pixel data on the upper side and part pixel data on the lower side of each of the image areas A1 to A3 indicated by a dotted line. In this case, the pixel data in the area indicated by the dotted line is densely included in the input image data Di (dense area). The pixel data of the other area is hardly included in the input image data Di (sparse area). In this case, the area in which the pixel data is densely included (dense area) and the area in which almost none pixel data is included almost none pixel data is included (sparse area) are alternately present in the input image data Di that is sequentially output from the image sensor 110 along the scan lines of the imaging screen P.

Figure 5C:
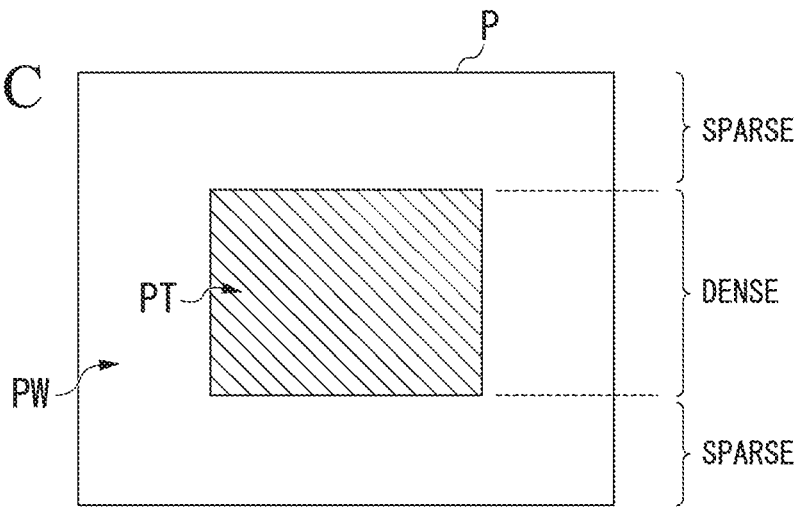
FIG. 5C is a diagram showing an operation of the data transfer device according to the first embodiment of the present invention, and is a diagram showing an example of image data that is a transfer target.

The imaging screen P shown in FIG. 5C includes a wide-angle image PW and a telephoto image PT. In multi-recording, pixel data of the imaging screen P including the wide-angle image PW and the telephoto image PT is transferred. In the multi-recording, an area of the telephoto image PT corresponds to an area in which capturing of an image (pixel data that is a transfer target) is performed. That is, the pixel data of the area of the telephoto image PT is densely included in the input image data Di (dense area). The other area (area of the wide-angle image PW) corresponds to an area in which almost none image is captured. That is, the pixel data of the other area (the area of the wide-angle image PW) is hardly included in the input image data Di (sparse area). In this case, the area in which the pixel data is densely included (dense area) and the area in which almost none pixel data is included almost none pixel data is included (sparse area) are alternately present in the input image data Di that is sequentially output from the image sensor 110 along the scan lines of the imaging screen P. The same applies to input image data acquired from the image sensor 110 by so-called digital zooming.

Figure 5D:
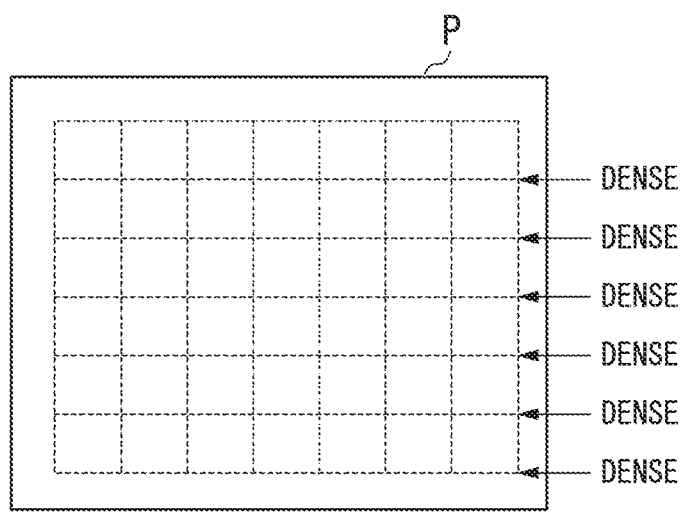
FIG. 5D is a diagram showing an operation of the data transfer device according to the first embodiment of the present invention, and is a diagram showing an example of image data that is a transfer target.

An imaging screen P shown in FIG. 5D includes a plurality of evaluation areas for acquiring an evaluation value of or exposure, white balance, or the like. In FIG. 5D, the plurality of evaluation areas are indicated by dotted lines. The evaluation value is included in the input image data Di corresponding to the last scan line of each evaluation area. Therefore, the evaluation values are densely included in the input image data Di corresponding to the last scan line of each evaluation area. That is, pixel data for evaluation is densely included in the area corresponding to the last scan line of each evaluation area (dense area). The pixel data for evaluation is hardly included in other areas (sparse area). Therefore, in this case, the area in which the pixel data is densely included (dense area) and the area in which almost none pixel data is included almost none pixel data is included (sparse area) for the evaluation values are present in the input image data Di that is sequentially output from the image sensor 110 along the scan lines of the imaging screen P.

In FIG. 6, a positional relationship between image areas A11 to A13 and image areas A21 to A23 in which transfer data is densely included when a plurality of frame images P1 and P2 forming the imaging screen P shown in FIG. 5A are continuous is shown. In the example of FIG. 6, it may be noted that a time interval between the image area A13 on the lower side of the beginning frame image P1 and the image area A21 on the upper side of the next frame image P2 is short. It is easy for interference in the transfer data between the frames to occur at a boundary between such frame images, and details thereof will be described below (see description of "2. When transfer data is final transfer data in frame image").

Next, an operation when the input image data Di forming the imaging screen P shown in FIGS. 5A to 5D described above is input from the image sensor 110 to the data transfer device 10 will be described by being separated into (1) a case in which the DMA transfer request REQ output from the data transfer device 10 is rapidly received by the bus arbiter 161, and (2) a case in which it take a long time to receive the DMA transfer request REQ output from the data transfer device 10.

For ease of understanding, six pieces of pixel data are assumed to be present consecutively in the area in which the pixel data of the input image data Di is densely included. Further, the six consecutive pieces of pixel data are set as one group, and a plurality of groups are included in the input image data Di. However, the present invention is not limited to this example, and an arrangement of pieces of pixel data included in the input image data Di can be arbitrarily set.

(1) When the DMA Transfer Receipt ACK is Rapidly Received

An operation when the DMA transfer receipt ACK is rapidly received will be described with reference to FIGS. 7A and 7B. The pixel data forming the input image data Di output from the image sensor 110 is sequentially input from the image extraction unit 122 to the write control unit 11 of the data transfer device 10 in units of 64 bytes corresponding to the pixel data of the 32 pixels, the data transfer device 10 being the data transfer unit 125. The write control unit 11 writes the input image data Di to the buffer unit 12 in units of 64 bytes corresponding to the 32 pixels as the transfer data that is transferred to the common bus 180 (step S1). Further, the write control unit 11 outputs a write completion notification signal SW indicating that the input image data Di has been written to the buffer unit 12 as shown in FIG. 7A each time 64 bytes of the pixel data corresponding to 32 pixels included in the input image data Di are written to the buffer unit 12 (step S1).

In FIG. 7A, a number inside a square schematically indicating the write completion notification signal SW corresponds to six pieces of pixel data densely included in the input image data Di. For example, a notation "1" indicates a signal SW(1) that is output from the write control unit 11 when the beginning (first) pixel data among the six pieces of pixel data densely included in the input image data Di is written to the buffer unit 12. This signal notation is similarly applied to the read control signal SC. That is, in FIG. 7A, notations "1" to "6" of the write completion notification signal SW indicate the write completion notification signals SW(1) to SW(6). The notations "1" to "6" of the read control signal SC indicate the read control signals SC(1) to SC(6).

In a process in which the pixel data forming the input image data Di is sequentially input to the write control unit 11, the image extraction unit 122 determines whether or not a position of the pixel data in the frame image sequentially input to the write control unit 11 is a position of the final transfer data in the frame image. When the position of the pixel data is the position of the final transfer data in the frame image, the image extraction unit 122 outputs the setting signal E3 including final transfer information indicating that the position of the pixel data (transfer data) is the position of the final transfer data in the frame image to the selector 1505. When the setting signal E3 including the final transfer information is input from the image extraction unit 122, the selector 1505 selects the setting signal E2 when the pixel data is read from the buffer unit 12 as transfer data.

Since the pixel data (transfer data) sequentially input to the write control unit 11 is not the final transfer data, the selector 1505 selects the setting signal E1 and the selector 1505 outputs the setting signal E1 to the counter 1503 and the read determination unit 1504, as described below. In this case, the time interval Ts between the read control signals SC is set to a predetermined time interval Ts1 using the setting signal E1 described above. The predetermined time interval Ts1 is longer than a predetermined time interval Ts2 (see FIG. 9A and FIG. 9B) to be described below that is set using the setting signal E2 when the final transfer data is transferred.

Specifically, the band-smoothing unit 15 generates the read control signal SC for reading the transfer data from the buffer unit 12 to smooth the band of the common bus 180 based on the write completion notification signal SW (step S2). That is, the band-smoothing unit 15 sequentially inputs the write completion notification signals SW which are sequentially output from the write control unit 11, to the FIFO memory 1501 shown in FIG. 3. The band-smoothing unit 15 outputs the write completion notification signals SW held in the FIFO memory 1501 as the read control signal SC to the read control unit 13 in an input order at regular time intervals Ts.

The band-smoothing unit 15 switches time intervals between the read control signals SC in response to the setting signal E3 indicating whether or not the pixel data (transfer data) input to the write control unit 11 is the final transfer data in the frame. Accordingly, the band-smoothing unit 15 switches between the time intervals Ts between the pieces of transfer data that are transferred to the common bus 180. Here, since the pixel data (transfer data) input to the write control unit 11 is not the final transfer data in the frame, the selector 1505 of the band-smoothing unit 15 selects the setting signal E1, and the band-smoothing unit 15 sets the time interval Ts between the pieces of transfer data to the time interval Ts1 based on the setting signal E1.

In the example of FIG. 7A, the write completion notification signals SW(1) to SW(6) that are output from the write control unit 11 to the band-smoothing unit 15 and the read control signals SC(1) to SC(6) output from the band-smoothing unit 15 are shown schematically. As shown in the example of FIG. 7A, the time interval Ts of the read control signals SC(1) to SC(6) is set to the time interval Ts1 determined based on the maximum value of the count value that is set in the counter 1503 using the setting signal E1.

When sparse or dense pixel data is present in the input image data Di, the transmission interval of the DMA transfer request REQ when the input image data Di in which the pixel data is densely included is transferred may be made long in order to smooth the band of the common bus 180 (that is, in order to uniformize transmission intervals of the DMA transfer request REQ that is output to the common bus 180). In this respect, the maximum value of the count value set in the counter 1503 shown in FIG. 3 is set so that the time interval Ts (Ts1) between the read control signals SC is greater than the time interval of the write completion notification signal SW, as described above. The time interval of the write completion notification signal SW corresponds to the time interval of the pixel data included in the input image data Di.

Since the time interval Tr of the DMA transfer request REQ increases as the time interval Ts between the read control signals SC increases, a data transfer speed tends to decrease. When the time interval Ts between the read control signals SC is too great, a subsequent process with data transfer may be obstructed. Accordingly, the maximum value of the count value set in the counter 1503 is set in a range in which a required data transfer speed can be obtained.

Subsequently, the read control unit 13 reads the transfer data from the buffer unit 12 in response to the read control signal SC input from the band-smoothing unit 15 (step S3). Here, when previous transfer data which has been read from the buffer unit 12 in response to the previous read control signal SC already exists, the read control unit 13 reads the current transfer data from the buffer unit 12, on condition that the DMA transfer receipt ACK to the DMA transfer request REQ for the previous transfer data has been received by the interface unit 14.

When the transfer data is read from the buffer unit 12 by the read control unit 13, the interface unit 14 outputs a DMA transfer request REQ to the common bus 180 and the interface unit 14 transfers the transfer data read from the buffer unit 12 to the common bus 180 according to a predetermined bus protocol (step S4). Specifically, as shown in FIG. 7A, the interface unit 14 sequentially outputs six DMA transfer requests REQ in response to the read control signals SC(1) to SC(6) input from the band-smoothing unit 15 at regular time intervals Ts (Ts1).

It is assumed that the DMA transfer requests REQ output from the interface unit 14 are rapidly received by the bus arbiter 161. Accordingly, as shown in FIG. 7A, before the interface unit 14 outputs the next DMA transfer request REQ, the interface unit 14 receives a DMA transfer receipt ACK indicating that the current DMA transfer request REQ is received by the bus arbiter 161. The interface unit 14 transfers the transfer data read from the buffer unit 12 by the read control unit 13 to the common bus 180 (step S4).

Thus, in a situation in which the DMA transfer requests REQ are rapidly received by the bus arbiter 161, the input image data Di densely including the six pieces of pixel data shown as the first group in FIG. 7B is output as the transfer data Do from the interface unit 14 to the common bus 180 at the time intervals Ts1 determined based on the maximum value of the count value set in the counter 1503. In the example shown in FIG. 7B, since the data transfer of the pixel data in the first group is completed before the input image data Di densely including the pixel data in the second group following the first group is input, data interference between the groups does not occur.

Accordingly, in the example of FIGS. 7A and 7B, in a situation in which the DMA transfer request REQ is rapidly received, a margin is generated to the time interval Tr of the DMA transfer request REQ by smoothing the band of the common bus 180. Therefore, when the input image data Di in which pixel data is densely included is transferred, the bus arbiter 161 appropriately arbitrates and receives the DMA transfer request REQ of each functional block. Thus, it possible to reduce a burden of the bus arbiter 161.

In the example of FIGS. 7A and 7B, the data transfer of the pixel data in each group is performed without interference even if the time interval Tr between the DMA transfer requests REQ is set to be long when the input image data Di in which the pixel data is densely included is transferred. Accordingly, even when the band of the common bus 180 is smoothed, the pixel data of the image sensor 110 can be transferred to the DRAM 163 according to the arbitration of the bus arbiter 161 without decreasing the data transfer speed.

In the example of FIGS. 7A and 7B, by smoothing the band of the common bus 180, a frequency at which the common bus 180 is occupied by the functional block 120 that is configured to transfer the pixel data acquired from the image sensor 110 to the DRAM 163 is decreased, and a frequency at which the DMA transfer request REQ of the other functional blocks 130, 140, and 150 is received by the bus arbiter 161 is increased. Accordingly, in the arbitration performed by the bus arbiter 161, even a priority of the functional block 120 for transferring the pixel data of the image sensor 110 to the DRAM 163 is set to be high, it is still possible to suppress an influence on the processes of the other functional blocks 130, 140, and 150, and to prevent the processes of the other functional blocks from being stagnated.

(2) When it Takes a Long Time to Receive the DMA Transfer Request REQ

Next, an operation when it takes a long time to receive the DMA transfer receipt ACK to the DM transfer request will be described with reference to FIGS. 8A and 8B.

A notation of the write completion notification signal SW and the read control signal SC is the same as that in the example of FIGS. 7A and 7B.

Similar to the above described case in which the DMA transfer receipt ACKs are rapidly received, the write control unit 11 sequentially outputs the write completion notification signals SW each time the write control unit 11 writes the input image data Di including the pixel data acquired from the image sensor 110 to the buffer unit 12 (step S1). The read control signals SC are sequentially output at regular time intervals Ts (Ts1) from the band-smoothing unit 15 in response to the write completion notification signal SW output from the write control unit 11 (step S2). The read control unit 13 reads the transfer data from the buffer unit 12 in response to the read control signal SC output from the band-smoothing unit 15 (step S3). The interface unit 14 outputs the DMA transfer request REQ for the transfer data read by the read control unit 13 in response to the read control signal SC, and the interface unit 14 transfers the transfer data (step S4).

Hereinafter, a case is assumed that it takes a long time for the first DMA transfer request REQ output from the interface unit 14 in response to the first read control signal SC(1) to be received by the bus arbiter 161, for example, due to congestion or the like of the common bus 180 is considered. In the example of FIG. 8A, it takes a long time for the first DMA transfer request REQ output from the interface unit 14 at time t0 to be received by the bus arbiter 161 at time t1. As a result, the DMA transfer receipt ACK to the first DMA transfer request REQ is received by the interface unit 14 at time t1 after the third read control signals SC(3) is output.

When the DMA transfer receipt ACK is received by the interface unit 14 at time t1, the read control unit 13 reads the next transfer data from the buffer unit 12 in response to the second read control signal SC(2) in step S3 described above. In the above-described step S4, the interface unit 14 outputs the DMA transfer request REQ for the transfer data read by the read control unit 13 in response to the second read control signal SC(2) and transfers the transfer data to the common bus 180.

In this case, the transfer data read from the buffer unit 12 by the read control unit 13 in response to the second and subsequent read control signals SC(2) to SC(6) temporarily is stagnated. In the example of FIG. 8B, since it takes a long time for the DMA transfer request REQ for the transfer data read from the buffer unit 12 in response to the first read control signal SC(1) to be received by the bus arbiter 161, transfer of transfer data Do(2) to Do(6) to be transferred in response to the second and subsequent read control signals SC(2) to SC(6) is stagnated.

However, according to the first embodiment, as described below, when a situation in which the DMA transfer requests REQ are rapidly received is recovered, the stagnated transfer of the transfer data is rapidly performed in a short time interval, and a delay of the transfer of the transfer data can be recovered.

This will be described in detail as the following. In the example of FIG. 8A, the second read control signal SC(2) and the third read control signal SC(3), in addition to the first read control signal SC(1), have already been output from the band-smoothing unit 15 to the read control unit 13 at time t1. Accordingly, when read control unit 13 receives the DMA transfer receipt ACK of the first transfer data read from the buffer unit 12 in response to the first read control signal SC(1), the read control unit 13 immediately reads the next transfer data from the buffer unit 12 in response to the second read control signal SC(2) in step S3 described above. Subsequently, in step S4 described above, the interface unit 14 outputs a DMA transfer request REQ of the transfer data read in response to the second read control signal SC(2) to the common bus 180, and the interface unit 14 transfers the transfer data to the common bus 180.

After the time t1, as long as the state in which the DMA transfer requests REQ are rapidly received is maintained, the DMA transfer request REQ is output from the interface unit 14 at a minimum time interval without being limited to the maximum value of the count value of the counter 1503. Accordingly, the second and subsequent remaining pieces of transfer data are rapidly transferred, and the delay of the transfer of the transfer data can be recovered.

In the example shown in FIG. 8B, before the input image data Di densely including pixel data in the second group next to the first group is input, a delay of the data transfer of the pixel data in the first group is recovered. Accordingly, it is possible to prevent an influence on the process due to a delay of transfer of first transfer data in the first group.

Thus, according to the first embodiment, it is possible to rapidly perform the stagnated data transfer while effectively using the band of the common bus 180.

2. When the Transfer Data is the Final Transfer Data in the Frame Image

Next, an operation of the data transfer device 10 when the final transfer data in the frame is transferred will be described in detail. Here, it is assumed that the pixel data (transfer data) sequentially input to the write control unit 11 is not the final transfer data, and the time interval Ts between the read control signals SC is set to the predetermined time interval Ts1 using the setting signal E1 described above.

As in the case in which the transfer data is not the final transfer data in the frame image, the write control unit 11 writes the input image data Di to the buffer unit 12 as the transfer data to be transferred to the common bus 180 (step S1). In a process in which the pixel data forming the input image data Di is sequentially input to the write control unit 11, the image extraction unit 122 determines whether or not a position of the pixel data (transfer data) in the frame image sequentially input to the write control unit 11 is a position of the final transfer data in the frame image. When the position of the transfer data is the position of the final transfer data in the frame image, the image extraction unit 122 outputs the setting signal E3 including final transfer information indicating that the position of the transfer data is the position of the final transfer data to the selector 1505.

Subsequently, the read control unit 13 reads the transfer data from the buffer unit, and the read control unit 13 transfers the transfer data to the common bus 180 (steps S2 to S4). Specifically, the band-smoothing unit 15 generates the read control signal SC for reading the transfer data from the buffer unit 12 to smooth the band of the common bus 180 based on the write completion notification signal SW (step S2). In this case, the band-smoothing unit 15 switches the time interval between the pieces of transfer data to be transferred to the common bus 180 by switching the time interval of the read control signal SC according to whether or not the transfer data is the final transfer data in the frame. Here, since the transfer data is the final transfer data in the frame, the setting signal E3 including the final transfer information is input from the image extraction unit 122 to the selector 1505. When the setting signal E3 including the final transfer information is input, the selector 1505 selects the setting signal E2 when the transfer data is read from the buffer unit 12, and the selector 1505 transmits the setting signal E2 to the counter 1503.

The band-smoothing unit 15 sets the time interval Ts between the pieces of transfer data to the time interval Ts2 based on the setting signal E2. Specifically, the write completion notification signals SW are sequentially output from the write control unit 11, and the band-smoothing unit 15 sequentially inputs the write completion notification signals SW to the FIFO memory 1501, as shown in FIG. 3. Then, the band-smoothing unit 15 outputs the write completion notification signals SW held in the FIFO memory 1501 as the read control signal SC in an input order at regular time intervals Ts (Ts2) determined based on the setting signal E2. Thus, as shown in FIG. 9A, the time interval Ts between the read control signals SC is set to the predetermined time interval Ts2 determined based on the setting signal E2.

In the example of FIG. 9A, the write completion notification signals SW(1) to SW(6) output from the write control unit 11 to the band-smoothing unit 15, and the read control signal SC(1) to SC(6) output from the band-smoothing unit 15 are shown schematically. The predetermined time interval Ts2 is a time interval shorter than the above-described predetermined time interval Ts1 (FIGS. 7A, 7B, and 8A) that is set using the setting signal E1 when data other than the final transfer data is transferred. The time interval Ts (Ts2) of the read control signals SC(1) to SC(6) is determined based on the maximum value of the count value set in the counter 1503 shown in FIG. 3 described above using the setting signal E2, and a repeated description thereof will be omitted.

Subsequently, the read control unit 13 reads the transfer data from the buffer unit 12 in response to the read control signal SC input from the band-smoothing unit 15 (step S3). The interface unit 14 transfers the transfer data read from the buffer unit 12 by the read control unit 13 to the common bus 180 (step S4).

The operation when the transfer data is the final transfer data is the same as the above-described operation when the transfer data is data other than the final transfer data except for the operation regarding the setting of the time interval Ts.

A relationship between the input image data Di and the final transfer data Do is shown in FIG. 9B. As shown in FIG. 9A and FIG. 9B, in response to the read control signals SC(1) to SC(6), the final transfer data Do are transferred to the common bus 180 with the time interval Ts2 (Ts2<Ts1) therebetween. As described above, since the time interval between the pieces of transfer data (that is, the time interval of the read control signal SC) is switched based on the setting signal E2, the transfer speed of the final transfer data in the frame is increased even when the band of the common bus 180 is smoothed. Therefore, it is possible to suppress the interference in the data near a boundary of the frame.

The process of suppressing the data interference will be described in detail with reference to FIG. 10.

In the example of FIG. 10, the time interval Ts between the pieces of transfer data is not switched, and the time interval Ts is fixed to the time interval Ts1. In FIG. 10, a period from time t1 to time t3 corresponds to the first frame, a time after time t3 corresponds to a second frame, and at time t2, transfer of the third group that is the final transfer data is started. When the transfer of the final transfer data is started at time t2, the setting signal E3 including the final transfer information becomes a high level.

The selector 1505 outputs the setting signal E2 to the counter 1503 in response to the setting signal E3 including the final transfer information. Thus, the maximum value of the count value of the counter 1503 is set using the setting signal E2 at time t2. Therefore, after time t2, the time interval Ts between the read control signals SC is set to the time interval Ts2 (<Ts1) (FIG. 10), and the time interval of the transfer data Do that is output from the data transfer device 10 to the common bus 180 is shortened from the time interval Ts1 to the time interval Ts2 (<Ts1).

As can be understood from FIG. 10, when the time interval of the transfer data Do is shortened to the time interval Ts2 at time t2, the transfer rate of the final transfer data in the first frame (the third group) is increased after time t2. Accordingly, before the transfer of the beginning data (the first group) in the second frame is started, the data transfer of the first frame is completed. Thus, even the band of the common bus 180 is smoothed when the data of the first group and the second group in the first frame is transferred, interference in the transfer data between the first frame and the second frame does not occur.

By setting the time interval of the read control signal SC to the time interval Ts2 (<Ts1), it is possible that the smoothing of the band of the common bus 180 is not be performed when the third group that is the final transfer data in the first frame is transferred. However, since the smoothing of the band of the common bus 180 is performed effectively during other data transfer, it is possible to utilize the band of the common bus 180 as a whole, and it is possible to reduce a burden on the process of the bus arbiter side.

According to the first embodiment, it is possible to smooth the band of the common bus while suppressing data interference between the frames. That is, it is possible to correctly transfer the final transfer data while controlling the band of the common bus 180.

In FIG. 11, as a reference example, a relationship between pieces of transfer data of the respective frames when the time interval Ts between the read control signals SC is not switched to the second time interval Ts, but is maintained at the time interval Ts1 when the final transfer data is transferred is shown. As shown in FIG. 11, when the time interval Ts between the read control signals SC is maintained at the time interval Ts1, the time interval of the transfer data Do that is transferred to the common bus 180 is maintained at the time interval Ts1. As a result, in the example of FIG. 11, the partial data Do(6) of the final transfer data (the third group) of the first frame interferes with the data in the first group of the second frame. In this case, the process using the data of the first frame and the second frame may not be successfully performed. However, according to the first embodiment of the present invention, it is possible to suppress data interference between the frames and to avoid process from being stagnated even when the band of the common bus 180 is smoothed, as shown in FIG. 10.

Second Embodiment

Next, a second embodiment of the present invention will be described.

Figure 12:
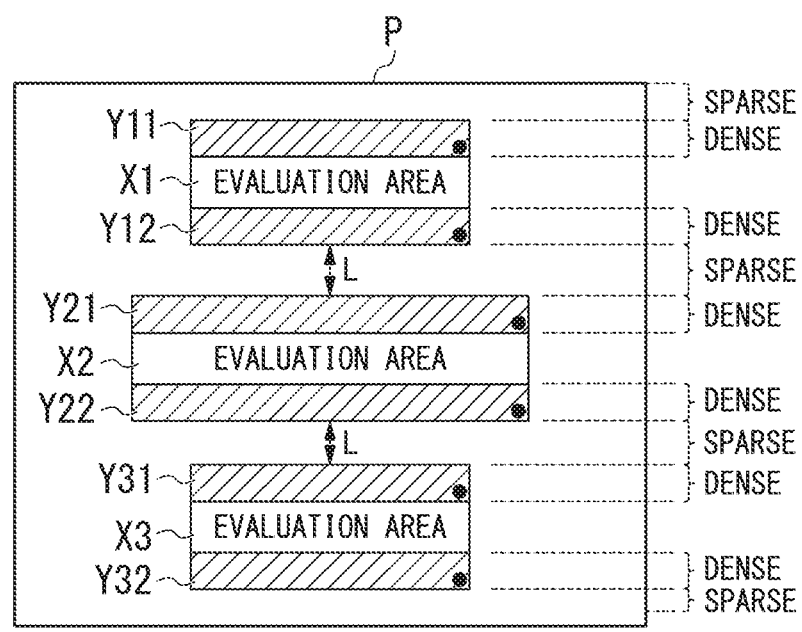
FIG. 12 is a diagram showing an operation of a data transfer device according to a second embodiment of the present invention, and is a diagram showing an example of a frame image that is a transfer target.

In the first embodiment described above, the signal indicating a set of data densely included in the image area A3 on the lower side of the imaging screen P shown in FIG. 5A is assumed as the setting signal E3, whereas in the second embodiment, as shown in FIG. 12, a signal including coordinates information indicating a position of a single datum that is lastly transmitted in an arbitrary image area in which data is densely included in a frame image forming the imaging screen P is used as the setting signal E3. In the second embodiment, the band-smoothing unit 15 adjusts the time interval Ts between the pieces of transfer data based on the coordinates information indicating the position of a single transfer datum in the frame image forming the imaging screen P. Other configurations are the same with those according to the first embodiment.

In the example of FIG. 12, image areas Y11, Y21, and Y31 (hatched areas) adjacent to the upper side of evaluation areas X1 to X3 set in the frame image forming the imaging screen P, and image areas Y12, Y22, and Y32 (hatched areas) adjacent to the lower side of evaluation areas X1 to X3, are correction areas for acquiring data that is used to correct the evaluation value. The correction area is an image area in which the transfer data is densely included. In FIG. 12, a coordinates position of a single last datum of each of the image areas Y11, Y21, Y31, Y12, Y22, and Y32 is schematically indicated by a black circle. In the second embodiment, the setting signal E3 includes information on the coordinates position of the single data shown by the black circle in FIG. 12. The existing signal that is generated during the image extraction process in the image extraction unit 122, for example, can be used as a signal indicating the coordinates position of such single image data. In the example of FIG. 12, the image area Y12 and the image area Y21 are separated by an interval L, and the image area Y22 and the image area Y31 are separated by the interval L.

According to the second embodiment, when the final datum of each image area in the frame image forming the imaging screen P is transferred, the setting signal E3 including the information on the coordinates position thereof is output from the image extraction unit 122. The band-smoothing unit 15 sets the maximum value of the count value of the counter 1503 based on the setting signal E3 supplied from the image extraction unit 122, and sets the time interval of the read control signal SC to the time interval Ts2.

Figure 13:
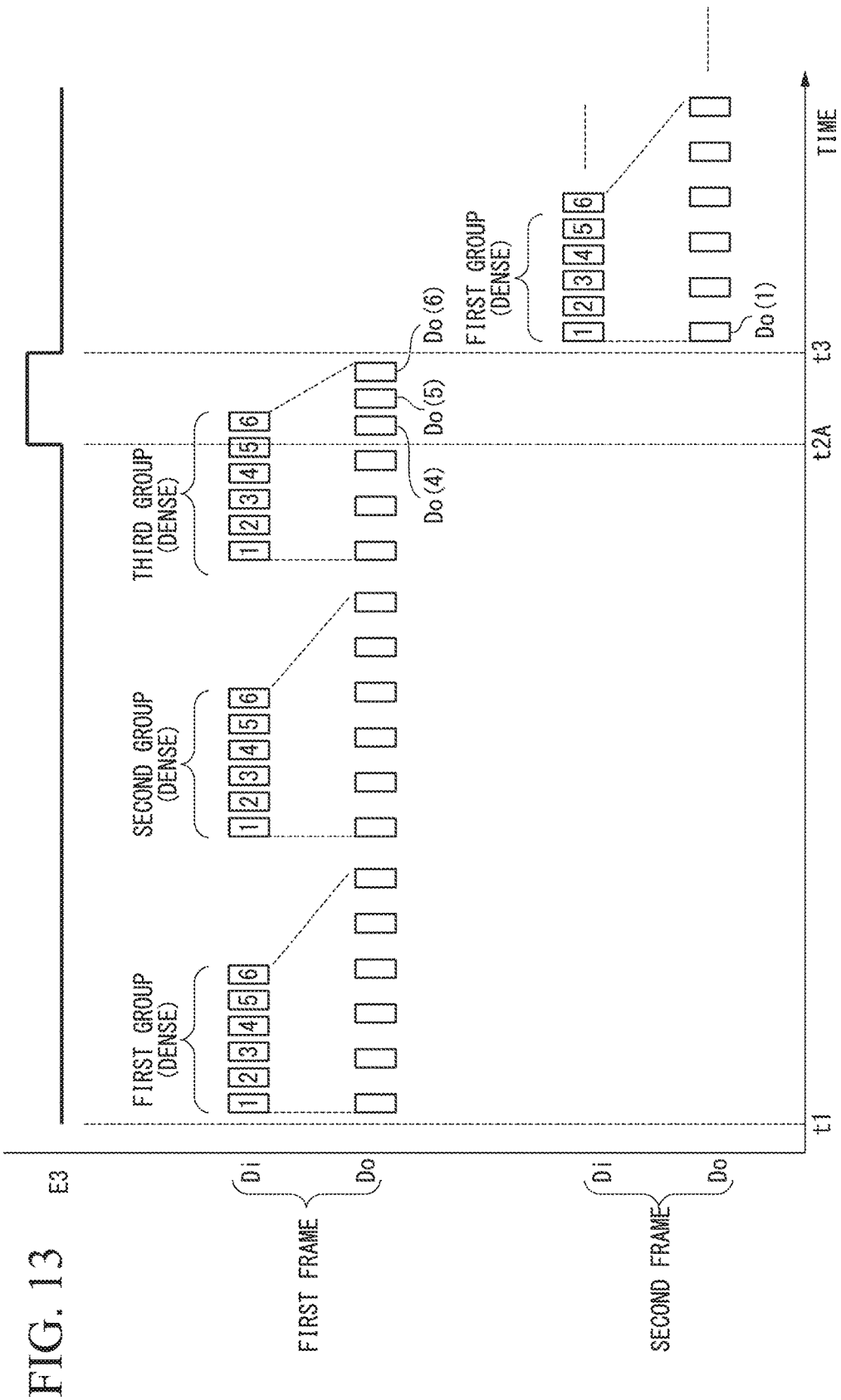
FIG. 13 is a diagram supplementarily showing an operation of the data transfer device according to the second embodiment of the present invention and is a diagram showing a relationship between pieces of transfer data between frames.

In the example of FIG. 13, at time t2A at which the setting signal E3 regarding a coordinates position of the last datum Di(6) of a third group is output, the time interval of the read control signal SC is switched to the time interval Ts2. That is, in the example of FIG. 13, at time t2A, the image extraction unit 122 acquires the coordinates position of the last datum Di (6) in the third group, and reflects the information thereon in the setting signal E3. When the setting signal E3 includes the information indicating the coordinates position of the last datum Di(6) included in the third group of the first frame, the band-smoothing unit 15 sets the time interval Ts between the read control signals SC to the time interval Ts2 determined based on the setting signal E2. Thus, after time t2A, the time interval of the transfer data Do that is transferred to the common bus 180 is shortened to the time interval Ts2. As a result, the transfer of all of the pieces of data of the first frame is completed before the data of the second frame is transferred, as in the example of FIG. 10 described above.

According to the second embodiment, in normal data transfer other than the last datum transfer of each image area in the frame, the time interval between the pieces of transfer data is set to the time interval Ts1 using the setting signal E1, and smoothing of the band of the common bus 180 is performed. Further, in the last datum transfer of each image area in the frame, the maximum value of the count value of the counter 1503 is set to a smaller value using the setting signal E2 than the maximum value of the count value of the counter 1503 that is set using the setting signal E1. Thus, the time interval Ts between the read control signals SC is shortened, and the time interval Tr of the DMA transfer request REQ is also shortened. In this case, the band of the common bus 180 is not smoothed; however, since the data transfer speed increases, it is possible to prevent data interference between the image areas and between frames.

According to the second embodiment, it is possible to smooth the band of the common bus while suppressing data interference regardless of the frame being inside or outside.

According to the second embodiment, by switching the time intervals Ts between the pieces of the transfer data according to the coordinate positions of each piece of the transfer data, it is possible to smooth the band of the common bus while suppressing data interference between the respective image areas even when a plurality of image areas with different sizes are included in a frame.

Third Embodiment

Next, a third embodiment of the present invention will be described.

Figure 14:
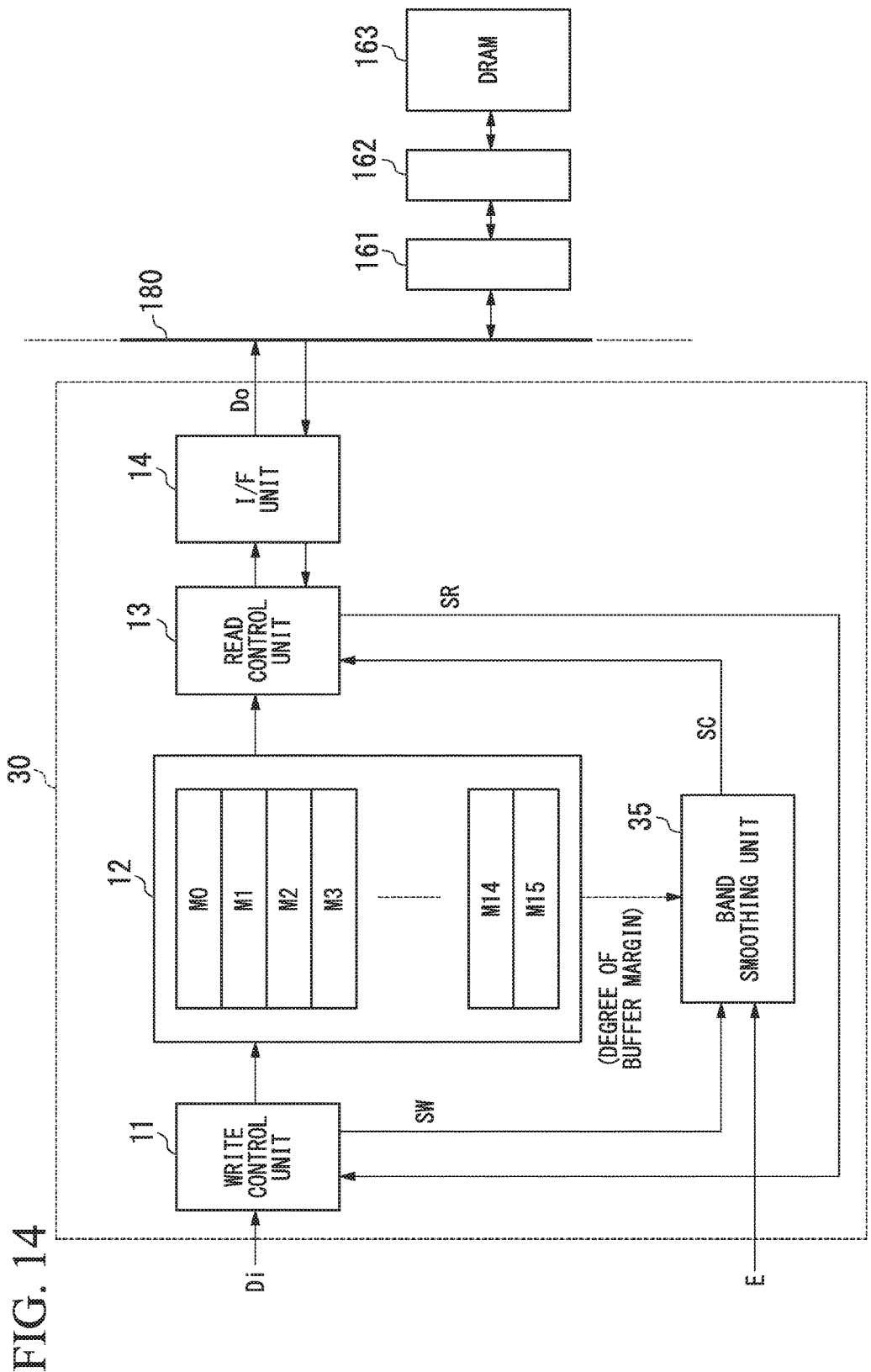
FIG. 14 is a block diagram showing a configuration example of a data transfer device according to a third embodiment of the present invention.

FIG. 14 is a block diagram showing a configuration example of the data transfer device 30 according to a third embodiment of the present invention. The data transfer device 30 includes a band-smoothing unit 35 in place of the band-smoothing unit 15 in the configuration of the data transfer device 10 shown in FIG. 2 according to the first embodiment described above. Otherwise the configuration of the data transfer device 30 is the same as that of the data transfer device 10 of the first embodiment.

Figure 15:
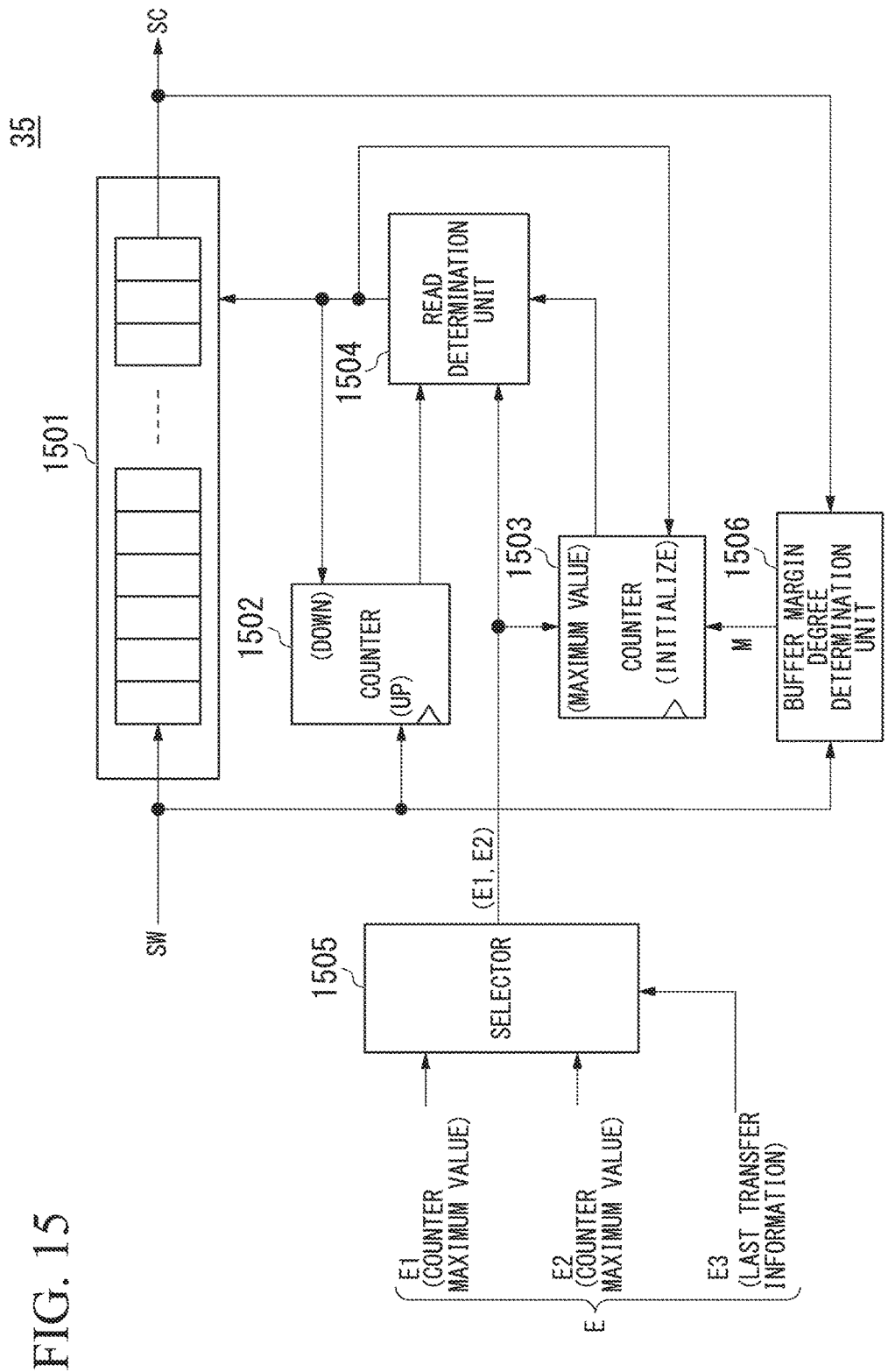
FIG. 15 is a block diagram showing a configuration example of a band-smoothing unit included in the data transfer device according to the third embodiment of the present invention.

FIG. 15 is a block diagram showing a configuration example of the band-smoothing unit 35 included in the data transfer device 30 according to a third embodiment of the present invention. The band-smoothing unit 35 further includes a buffer margin degree determination unit 1506 in the configuration of the band-smoothing unit 15 shown in FIG. 3 according to the first embodiment described above. Otherwise the configuration of the band-smoothing unit 35 is the same as that of the band-smoothing unit 15 of the first embodiment.

The buffer margin degree determination unit 1506 determines the remaining capacity (buffer margin) of the buffer unit 12. The band-smoothing unit 35 adjusts the time interval (the time intervals Ts1 and Ts2 set using the setting signals E1 and E2) between the pieces of transfer data that is transferred to the common bus 180 according to a result of the determination of the buffer margin degree determination unit 1506. Specifically, the band-smoothing unit 35 is configured to decrease the time interval Ts between the pieces of transfer data as the remaining capacity of the buffer unit 12 decreases. In the third embodiment, the band-smoothing unit 35 sets the time interval of the read control signal SC according to the setting signals E1 and E2, similar to the first embodiment, and adjusts the time interval of the read control signal SC according to the remaining capacity of the buffer unit 12.

The adjustment of the time interval of the read control signal SC using the setting signals E1 and E2 may be omitted and, in this case, smoothing of the band of the common bus 180 is not performed.

The band-smoothing unit 35 recognizes a remaining capacity of the buffer unit 12 from a difference between the number of write completion notification signals SW (that is, the number of pieces of data written to the buffer unit 12) and the number of the read control signals SC (that is, the number of pieces of data read from the buffer unit 12). A small remaining capacity of the buffer unit 12 means that data is highly unlikely to be written to the buffer unit 12, and a function of the buffer unit 12 is highly likely to be impaired. The buffer margin degree determination unit 1506 outputs a signal M indicating the remaining capacity (buffer margin) of the buffer unit 12 to the counter 1503. In the third embodiment, the signal M indicates any one of there being a margin in the remaining capacity of the buffer unit 12, the remaining capacity being small, and there being almost no remaining capacity.

Figure 16:
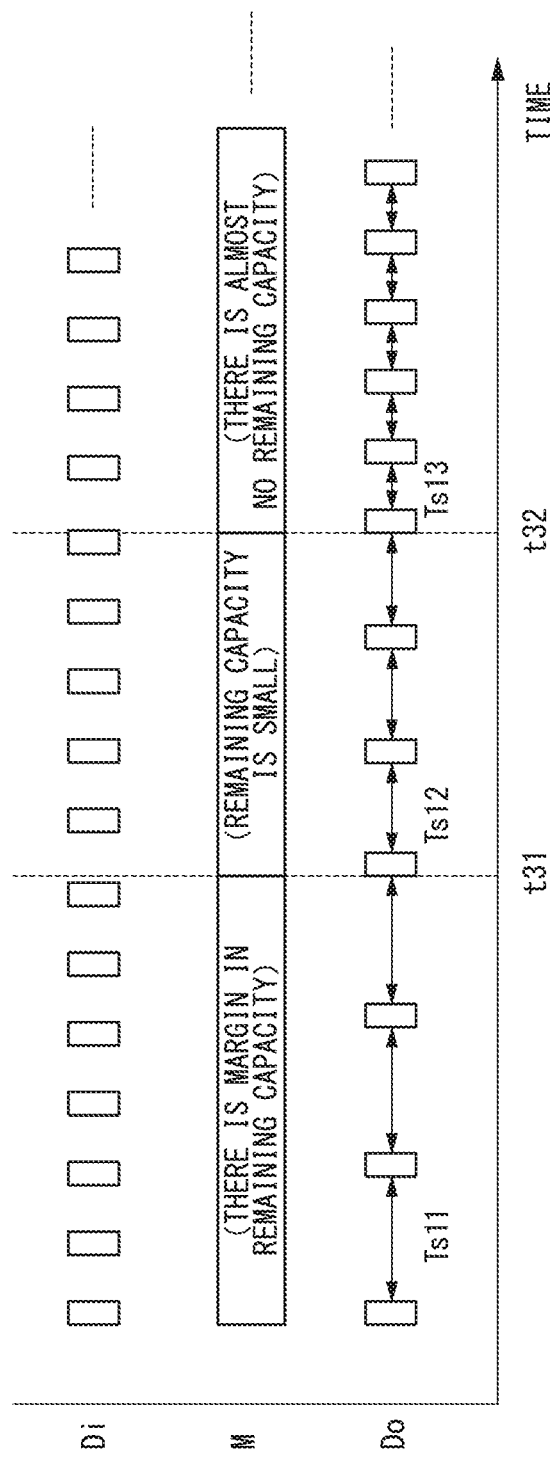
FIG. 16 is a diagram showing an operation of the band-smoothing unit included in the data transfer device according to the third embodiment of the present invention, and is a diagram showing a relationship between a remaining capacity of a buffer unit and a time interval between pieces of transfer data.

FIG. 16 is a diagram showing an operation of the band-smoothing unit 35 included in the data transfer device 30 according to the third embodiment of the present invention, and the FIG. 16 is a diagram showing a relationship between a remaining capacity of the buffer unit 12 and time intervals Ts11 (=ts1), Ts12, and Ts13 between the pieces of transfer data.

The counter 1503 adjusts the maximum value of the count value set according to the setting signals E1 and E2 based on the signal M input from the buffer margin degree determination unit 1506. In the example of FIG. 16, when the signal M indicates that there is a margin in the remaining capacity of the buffer unit 12, the band-smoothing unit 35 sets a time interval Ts11 as the time interval Ts between the read control signals SC, the time interval Ts11 being obtained by multiplying the time interval Ts1 determined based on the setting signal E1 by a first predetermined coefficient "1". In this case, the time interval Ts of the transfer data Do that is transferred to the common bus 180 is set to the same value as the time interval Ts1.

When the signal M indicates that the remaining capacity of the buffer unit 12 is small at time t31, the band-smoothing unit 35 sets a time interval Ts12 as the time interval Ts between the read control signals SC, the time interval Ts12 being obtained by multiplying the time interval Ts1 determined based on the setting signal E1 by a second predetermined coefficient "0.5". Thus, the time interval Ts of the transfer data Do that is transferred to the common bus 180 is set to a value of ½ (=Ts1×0.5) of the time interval Ts1.

Further, when the signal M indicates that there is almost no remaining capacity in the buffer unit 12 at time t32, the band-smoothing unit 35 sets a time interval Ts13 as the time interval Ts between the read control signals SC, the time interval Ts 13 being obtained by multiplying the time interval Ts1 determined based on the setting signal E1 by a third predetermined coefficient "0.2". Thus, the time interval of the transfer data Do that is transferred to the common bus 180 is set to a value of ⅕ (=Ts1×0.2) of the time interval Ts1.

In the above-described example, the value of each of the first coefficient, the second coefficient, and the third coefficient are only examples, and the value of each coefficient can be arbitrarily set as long as the remaining capacity of the buffer unit 12 can be adjusted.

As described above, if the remaining capacity of the buffer unit 12 indicated by the signal M is small, the band-smoothing unit 35 decreases the time interval Ts1 of the read control signal SC that is set using the setting signal E1, and the band-smoothing unit 35 decreases the time interval Ts (=Ts1) between the pieces of transfer data. Similarly, if the remaining capacity of the buffer unit 12 indicated by the signal M is small, the band-smoothing unit 35 decreases the time interval Ts2 of the read control signal SC set using the setting signal E2 to decrease the time interval Ts (=Ts2) between the pieces of transfer data. As a result, a speed of reading from the buffer unit 12 relatively increases as compared with a speed of writing to the buffer unit 12, such that the remaining capacity of the buffer unit 12 is increased.

According to the third embodiment, since the time interval Ts between the pieces of transfer data is controlled in accordance with the remaining capacity of the buffer unit 12, it is possible to stabilize an operation of writing data to the buffer unit 12 and stably maintain a buffer function of the buffer unit 12.

Next, effects of the first to third embodiments described above will be verified by comparison with the technology according to Japanese Unexamined Patent Application, First Publication No. 2006-39672.

Figure 17A:
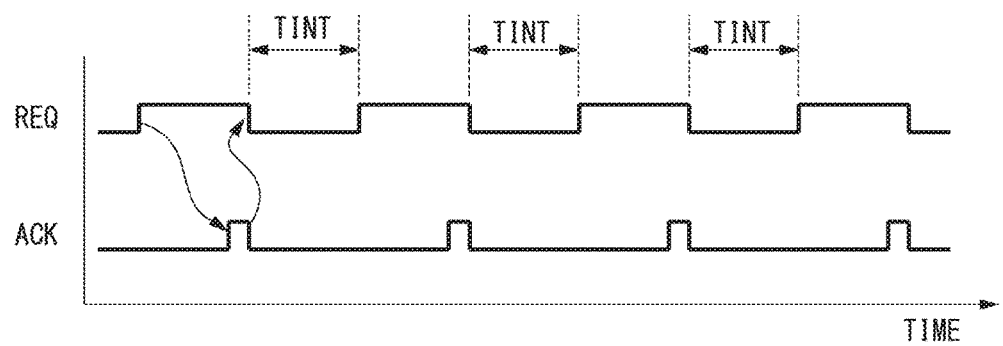
FIG. 17A is a diagram showing an operation example of a data transfer device according to the related art for supplementing effects of the data transfer device according to the embodiment of the present invention, and is a timing chart showing an operation when a time until a DMA transfer request is received is short.
Figure 17B:
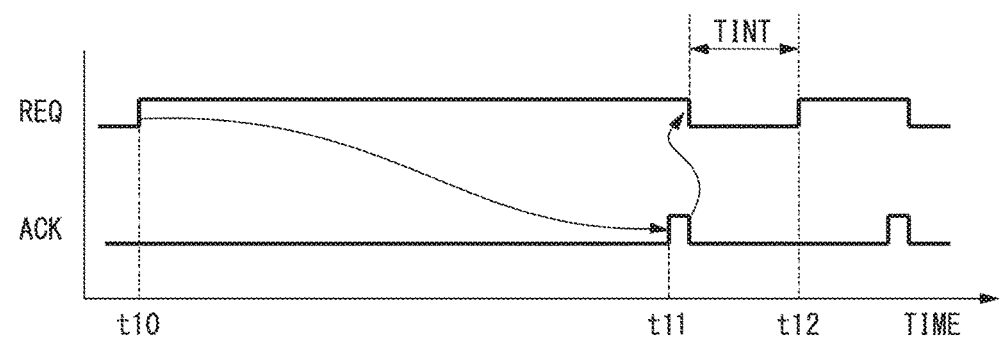
FIG. 17B is a diagram showing an operation example of the data transfer device according to the related art for supplementing effects of the data transfer device according to the embodiment of the present invention, and is a timing chart showing an operation when a time until a DMA transfer request is received is long.

FIGS. 17A and 17B are diagrams showing an operation example of a data transfer device according to the related art for supplementing those for effects of the data transfer device according to the embodiment of the present invention. FIG. 17A is a timing chart showing an operation when a time until a DMA transfer request is received is short. FIG. 17B is a timing chart showing an operation when a time until a DMA transfer request is received is long.

According to the technology of Japanese Unexamined Patent Application, First Publication No. 2006-39672, a time interval TINT of a DMA transfer request REQ is fixed to a constant value, as shown in FIG. 17A. Therefore, when a long time is required until a DMA transfer receipt ACK is received at time t11 after a first DMA transfer request REQ is output to a common bus at time t10 as shown in FIG. 17B, a next DMA transfer request REQ is output at time t12 at regular time intervals TINT from the first DMA transfer request REQ. In other words, when a time corresponding to the regular time interval TINT has not elapsed even through the first DMA transfer request REQ has been received, the next DMA transfer request REQ is not output. Therefore, it is impossible to rapidly transfer the transfer data being stagnated until the first DMA transfer request REQ is received.

On the other hand, according the first to third embodiments of the present invention described above, in a situation in which a long time is required until the DMA transfer request REQ is received, the time interval Tr of the DMA transfer requests REQ is not limited to the time interval Ts between the read control signals SC output from the band-smoothing unit 15, and the DMA transfer request REQ is output at minimum time intervals. Therefore, it is possible to rapidly output another DMA transfer request REQ following a DMA transfer request REQ which requires a long time to be received by the bus arbiter 161. Therefore, even when a long time is required until the DMA transfer request REQ is received, it is possible to rapidly transfer the transfer data being stagnated in the meantime, and it is possible to suppress a decrease in the data transfer speed.

According the first to third embodiments of the present invention described above, in a situation in which the DMA transfer request REQ is rapidly received, in order to smooth the band of the common bus 180, the time interval Tr of the DMA transfer request REQ is set according to the time interval Ts between the read control signals SC output from the band-smoothing unit 15. Even when the time interval Tr of the DMA transfer request REQ has been set in this way, the pieces of pixel data of the respective groups do not originally interfere with each other in a situation in which the DMA transfer request REQ is rapidly received as shown in FIG. 17A, and therefore, the data transfer speed is not degraded.

According to the above-described embodiment, the common bus 180 is smoothed such that the DMA transfer request REQ of the low-priority functional block can be received. Accordingly, even when a situation in which the DMA transfer request REQ of the high-priority functional block cannot be received for a long time occurs, it is possible to resolve the delay of the data transfer. Therefore, the processing of the high-priority functional block is preferentially performed and stagnation of processing of a low-priority functional block can be effectively prevented.

Next, main effects of the embodiments of the present invention are summarized.

According the first to third embodiments of the present invention, it is possible to smooth the band of the common bus 180 while suppressing data interference between frames. Further, according to the embodiment of the present invention, it is possible to rapidly perform the stagnated data transfer while effectively using the band of the common bus 180. Further, since the time interval Ts between the pieces of transfer data is adjusted according to a remaining capacity of the buffer unit 12, it is possible to stabilize a buffer function of the buffer unit 12.

It is possible to output the DMA transfer request REQ according to the amount of transfer data held in the buffer unit 12, and accordingly, it is possible to smooth the band of the common bus 180 according to the amount of transfer data.

Even when a DMA transfer request cannot be received for a long time, it is possible to prevent process from being stagnated in a buffer for transfer data.

It is possible to control the band before outputting the DMA transfer request REQ, and it becomes easy to control the band of the common bus 180.

Since it is not necessary to include a complicated circuit for controlling the time interval Tr of the DMA transfer request REQ, the size of the circuit can be reduced.

In a situation in which the DMA transfer request REQ is rapidly received by the bus arbiter 161, it is possible to smooth the band of the common bus 180. Therefore, it is possible to secure the process of the low-priority functional block while performing the process of the high-priority functional block in the arbitration of the bus arbiter 161.

Even if a situation occurs that it takes a long time until the DMA transfer request REQ is received by the bus arbiter 161, a delay caused by the stagnated data transfer, since it takes a long time until a DMA transfer request REQ is received, can be recovered thereafter if the situation in which the DMA transfer requests REQ are rapidly received by the bus arbiter 161 is recovered.

When the input image data Di having sparse or dense pixel data is input, it is possible to smooth the band of the common bus 180 by distributing the DMA transfer request REQ on a time axis.

When the priority of each functional block is set in the bus arbiter according to a state in which a data rate of the DMA transfer is high, the bus arbiter can receive a DMA transfer request of another low-priority functional block even when DMA transfer requests of a high-priority functional block are continuous. Accordingly, the bus ownership is not occupied by the high-priority functional block, and the low-priority functional block can secure the bus ownership. Therefore, it is possible to prevent processing of a low-priority functional block from remaining.

With a simple configuration, it is possible to adjust the time interval Tr of the DMA transfer request REQ.

Even when a rule of the arbitration of the bus arbiter 161 is changed, it is possible to smooth the band of the common bus 180 by adjusting the maximum value of the count value of the counter 1503 using the setting signal E.

Preferred embodiments of the present invention have been described, but the present invention is not limited to these embodiments and modification examples thereof. Additions, omissions, substitutions, and other modifications of configurations can be made without departing from the spirit or scope of the present invention. The present invention is not limited by the foregoing description and is only limited by the scope of the appended claims.

What is claimed is:

1. A data transfer device, comprising:
   a buffer unit configured to temporarily store transfer data that is transferred to a common bus, the transfer data being used for forming a frame image;
   a write control unit configured to write input data as the transfer data to the buffer unit;
   a read control unit configured to read the transfer data from the buffer unit;
   an interface unit configured to transfer the transfer data to the common bus according to a predetermined bus protocol, the transfer data being read from the buffer unit by the read control unit; and
   a band-smoothing unit configured to smooth a band of the common bus,
   wherein the band-smoothing unit includes a first parameter corresponding to a time interval between pieces of the transfer data when the transfer data except final transfer data included in the frame image is transferred to the common bus, and a second parameter corresponding to the time interval when the final transfer data is transferred to the common bus,
   wherein the band-smoothing unit sets the time interval using the first parameter when the position of the transfer data in the frame image is a position of transfer data other than the final transfer data,
   wherein the band-smoothing unit sets the time interval using the second parameter when the position of the transfer data in the frame image is a position of the final transfer data; and
   wherein the time interval that is set using the second parameter is shorter than the time interval that is set using the first parameter.

2. The data transfer device according to claim 1, further comprising:
   a determination unit configured to determine a remaining capacity of the buffer unit,
   wherein the band-smoothing unit adjusts the time interval in accordance with the remaining capacity of the buffer unit determined by the determination unit.

3. A data transfer device, comprising:
   a buffer unit configured to temporarily store transfer data that is transferred to a common bus, the transfer data being used for forming a frame image;
   a write control unit configured to write input data as the transfer data to the buffer unit;
   a read control unit configured to read the transfer data from the buffer unit;
   an interface unit configured to transfer the transfer data to the common bus according to a predetermined bus protocol, the transfer data being read from the buffer unit by the read control unit;
   a band-smoothing unit configured to smooth a band of the common bus by setting a time interval between pieces of final transfer data in the frame image to be shorter than the time interval between pieces of the transfer data except for the final transfer data in the frame image; and
   a determination unit configured to determine a remaining capacity of the buffer unit,
   wherein the band-smoothing unit adjusts the time interval in accordance with the remaining capacity of the buffer unit determined by the determination unit, and
   wherein the band-smoothing unit decreases the time interval as the remaining capacity of the buffer unit is small.

4. A data transfer method, comprising:
   temporarily storing transfer data that is transferred to a common bus by a buffer unit, the transfer data being used for forming a frame image;
   writing input data as the transfer data to the buffer unit;
   reading the transfer data from the buffer unit;
   transferring the transfer data to the common bus according to a predetermined bus protocol, the transfer data being read from the buffer unit during; and
   smoothing a band of the common bus,
   wherein a first parameter corresponding to a time interval between pieces of the transfer data when the transfer data except final transfer data included in the frame image is transferred to the common bus, and a second parameter corresponding to the time interval when the final transfer data is transferred to the common bus are used when smoothing the band of the common bus,
   wherein the time interval is set by using the first parameter when the position of the transfer data in the frame image is a position of transfer data other than the final transfer data,
   wherein the time interval is set by using the second parameter when the position of the transfer data in the frame image is a position of the final transfer data; and
   wherein the time interval that is set using the second parameter is shorter than the time interval that is set using the first parameter.

* * * * *